(12) United States Patent
Schaerges et al.

(10) Patent No.: US 10,353,559 B2
(45) Date of Patent: Jul. 16, 2019

(54) INTERACTION MECHANISMS FOR RANGE SLIDER CONTROL

(71) Applicant: SAP SE, Walldorf (DE)

(72) Inventors: Hans-Peter Schaerges, Mannheim (DE); Gerard Keane, Wiesloch (DE); Johannes Osterhoff, Heidelberg (DE)

(73) Assignee: SAP SE, Walldorf (DE)

( * ) Notice: Subject to any disclaimer, the term of this patent is extended or adjusted under 35 U.S.C. 154(b) by 225 days.

(21) Appl. No.: 15/229,862

(22) Filed: Aug. 5, 2016

(65) Prior Publication Data

US 2018/0039398 A1    Feb. 8, 2018

(51) Int. Cl.
*G06F 3/0484* (2013.01)
*G06F 3/0488* (2013.01)

(52) U.S. Cl.
CPC ...... *G06F 3/04847* (2013.01); *G06F 3/04883* (2013.01)

(58) Field of Classification Search
CPC ... G06F 3/04847; G06F 3/0485; G06F 3/0481
See application file for complete search history.

(56) References Cited

U.S. PATENT DOCUMENTS

| | | | |
|---|---|---|---|
| 7,765,491 B1 * | 7/2010 | Cotterill | G06F 3/0485 345/156 |
| 2011/0258569 A1 * | 10/2011 | Weir | G06F 3/04847 715/771 |
| 2014/0282252 A1 * | 9/2014 | Edwards | G06F 3/04847 715/833 |

OTHER PUBLICATIONS

"GooCubelets: The Void || Block Pushing Puzzle Game", YouTube video screen caps. "Goocublets.pdf", 2pgs youtube.com/watch?v=okbDhCmUI0E (Year: 2016).*

* cited by examiner

*Primary Examiner* — Haoshian Shih
(74) *Attorney, Agent, or Firm* — Schwegman Lundberg & Woessner, P.A.

(57) ABSTRACT

Systems and methods are provided for displaying a range slider comprising a left handle and a right handle, wherein the left handle and the right handle are separated by a distance greater than a predetermined threshold distance, and detecting a first user interaction with the range slider to move a first selected handle from a first position to a second position. Systems and methods further provide for determining, that the second position of the first selected handle results in the left handle and the right handle being separated by a distance less than the predetermined threshold distance. The systems and methods further provide for detecting a second user interaction with the range slider to move a second selected handle, determining, based on the second user interaction, a direction of movement of the second selected handle, and causing the distance between the left handle and the right handle to stay constant such that the range of the left handle and the right handle moves in the direction of movement of the second selected handle, based on a determination that the second selected handle is the left handle and the initial direction of movement is to the right or that the second selected handle is the right handle and the initial direction of movement is to the left.

20 Claims, 29 Drawing Sheets

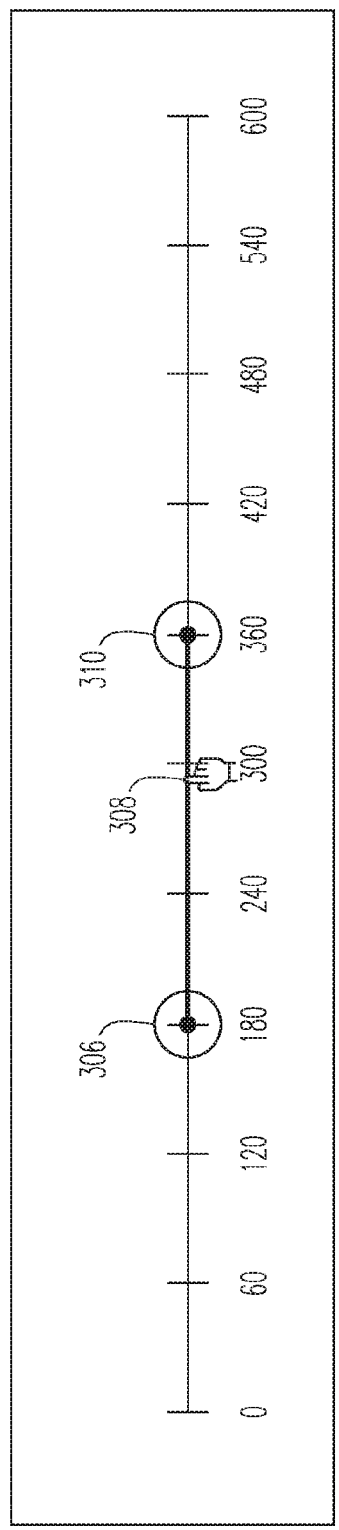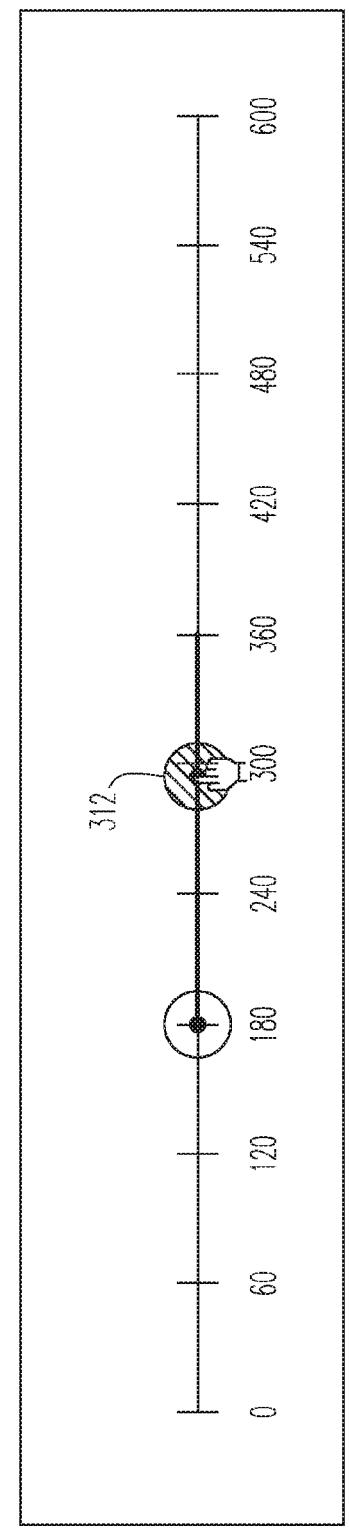

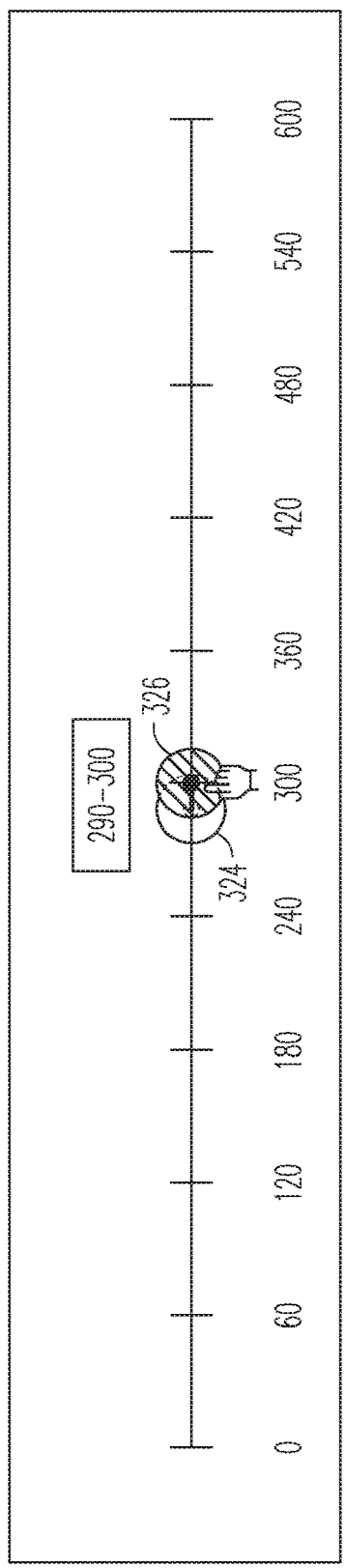

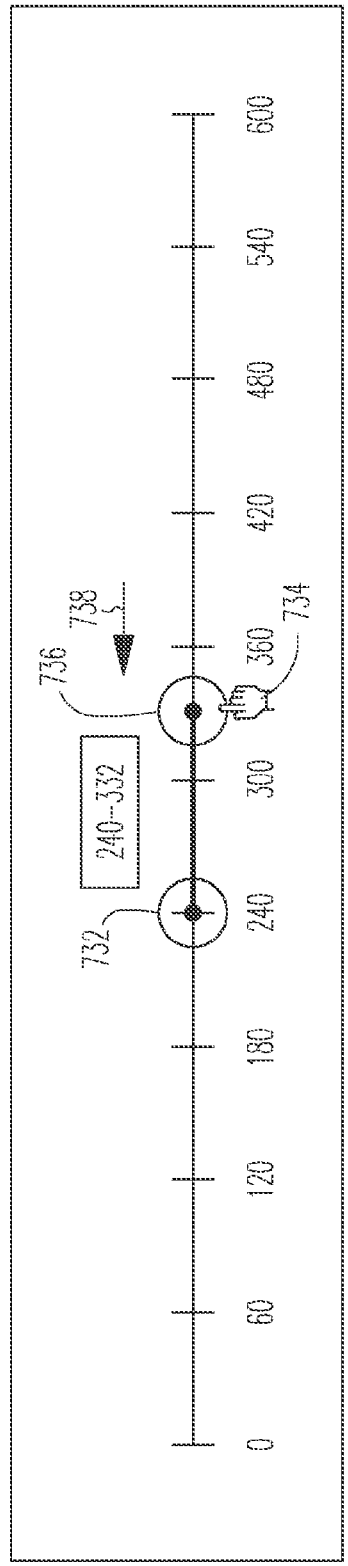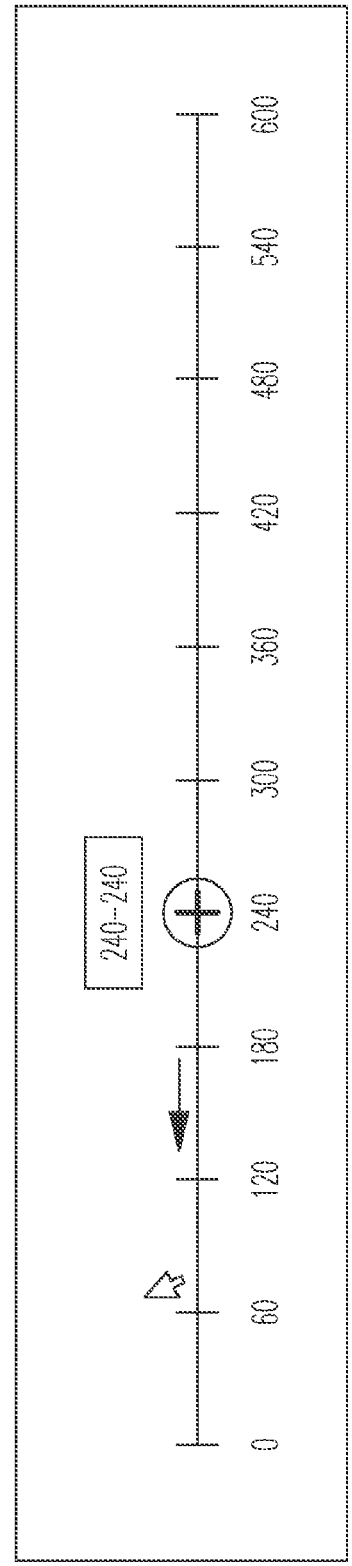
FIG. 7C
FIG. 7D

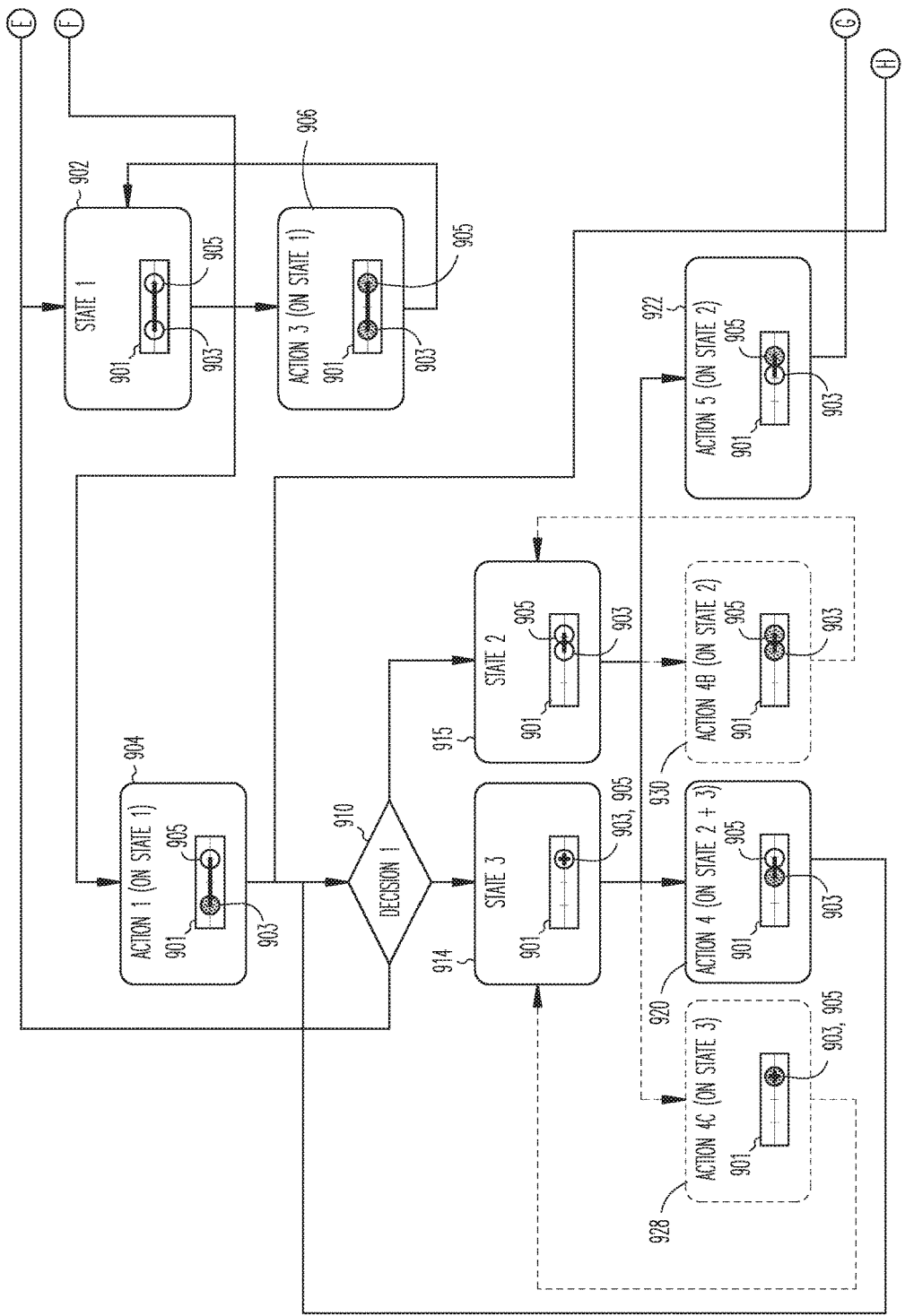

INTERACTION MECHANISMS FOR RANGE SLIDER CONTROL

BACKGROUND

Graphical user interfaces (GUIs) allow users to interact with electronic devices, such as computers and mobile devices, through graphical icons and visual indicators, as opposed to text-based interfaces, which rely on typed command labels or text navigation. GUIs have become the predominant mechanism to interface with electronic devices. GUIs may be built into an operating system of a device, but may also be built into individual applications running in the operating system. One such individual application is a web browser which, in combination with a web page accessed by the web browser via the Internet, can render a GUI within the GUI of the operating system in which the web browser is operating. While the web browser GUI operates within the confines of the operating system GUI, it is a separate GUI with its own distinct functionality.

A GUI control, such as a "range slider," may be used in many applications for specifying an interval of values. A typical implementation of this interface control allows the adjustment of the individual handles, but not the adjustment of the range (e.g., keeping the distance between the two handles). Additionally, there are challenges for controlling the adjustment of the range on a mobile device with touch-based gestures.

BRIEF DESCRIPTION OF THE DRAWINGS

Various ones of the appended drawings merely illustrate example embodiments of the present disclosure and should not be considered as limiting its scope.

FIGS. 3A-3J illustrate example range sliders, according to some example embodiments.

FIGS. 7C-7D illustrate example range sliders, according to some example embodiments.

FIGS. 9A-9B show a block diagram illustrating behavior of a range slider control, according to some example embodiments.

DETAILED DESCRIPTION

Systems and methods described herein relate to mechanisms for range slider control. In one example embodiment, a computing device may display a range slider comprising a left handle and a right handle. The left handle and the right handle may be separated by a distance greater than a predetermined threshold distance. The computing device may detect a first user interaction with the range slider to move a first selected handle from a first position to a second position. The computing device may determine that the second position of the first selected handle results in the left handle and the right handle being separated by a distance less than the predetermined threshold distance.

The computing device may detect a second user interaction with the range slider to move a second selected handle, and determine, based on the second user interaction, an initial direction of movement of the second selected handle. The computing device may cause the distance between the left handle and the right handle to stay constant such that the range of the left handle and the right handle moves in the direction of movement of the second selected handle, based on a determination that the second selected handle is the left handle and the initial direction of movement is to the right or that the second selected handle is the right handle and the initial direction of movement is to the left. The computing device may move the range of the left handle and the right handle in the initial direction of movement.

Figure 1A:
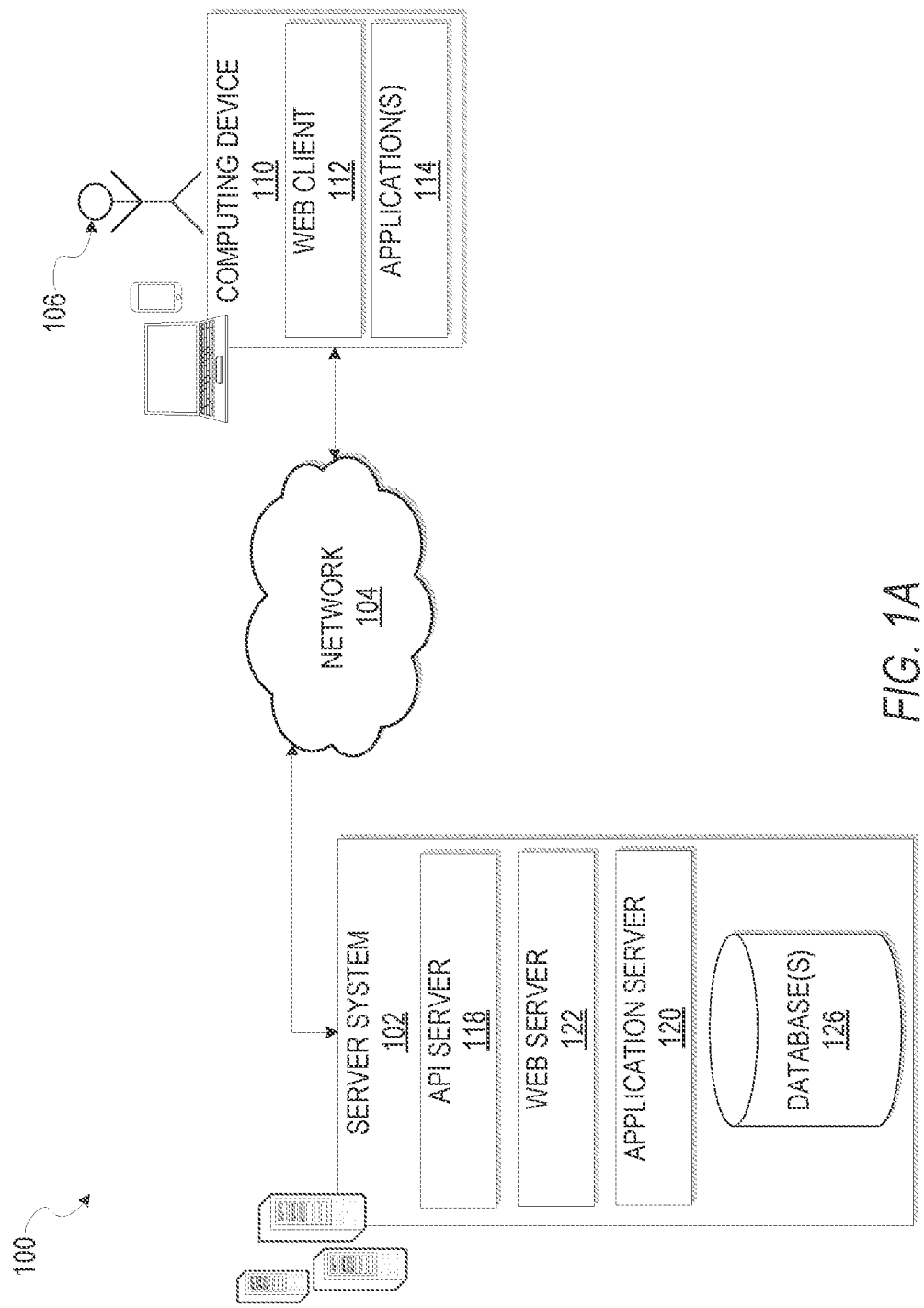
FIG. 1A is a block diagram illustrating a networked system, according to some example embodiments.

FIG. 1A is a block diagram illustrating a networked system 100, according to some example embodiments, configured to provide interaction mechanisms for range slider control. The system 100 may include one or more computing devices such as computing device 110. The computing device 110 may comprise, but is not limited to, mobile phones, desktop computers, laptops, portable digital assistants (PDAs), smart phones, tablets, ultra books, netbooks, laptops, multi-processor systems, microprocessor-based or programmable consumer electronics, game consoles, set-top boxes, computers in vehicles, or any other communication device that a user may utilize to access the networked system 100. In some embodiments, the computing device 110 may comprise a display module (not shown) to display information (e.g., in the form of user interfaces). In further embodiments, the computing device 110 may comprise one or more of touch screens, accelerometers, gyroscopes, cameras, microphones, global positioning system (GPS) devices, and so forth.

The computing device 110 may be a device of a user that is used to access, search, and display various information for e-commerce, location and map information, product information, travel information, and so forth. In one embodiment, the system 100 provides mechanisms for range slider control via one or more applications on a computing device 110 or accessed via a computing device 110.

One or more users 106 may be a person, a machine, or other means of interacting with the computing device 110. In example embodiments, the user 106 may not be part of the system 100, but may interact with the system 100 via the computing device 110 or other means. For instance, the user 106 may provide input (e.g., touch screen input or alphanumeric input) to the computing device 110 and the input may be communicated to other entities in the system 100 (e.g., server system 102, other computing devices 110, third party servers, etc.) via a network 104. In this instance, the other entities in the system 100, in response to receiving the input from the user 106, may communicate information to the computing device 110 via the network 104 to be presented to the user 106. In this way, the user 106 may interact with the various entities in the system 100 using the computing device 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The computing device 110 may access the various data and applications provided by other entities in the system 100 via web client 112 (e.g., a browser, such as the Internet Explorer® browser developed by Microsoft® Corporation of Redmond, Wash. State) or one or more applications 114. The computing device 110 may include one or more applications 114 (also referred to as "apps") such as, but not limited to, a web browser, messaging application, electronic mail (email) application, an e-commerce site application, a mapping or location application, a parking application, and the like. In some embodiments, one or more applications 114 may be included in a given one of the computing device 110, and configured to locally provide the user interface and at least sonic of the functionalities with the application 114 configured to communicate with other entities in the system 100 (e.g., server system 102, etc.), on an as needed basis, for data and/or processing capabilities not locally available (e.g., access location or map information, authenticate a user 106, verify a method of payment, etc.). Conversely, one or more applications 114 may not be included in the computing device 110, and then the computing device 110 may use its web browser to access the one or more applications hosted on other entities in the system 100 (e.g., server system 102, etc.).

A server system 102 may provide server-side functionality via the network 104 (e.g., the Internet or wide area network (WAN)) to one or more computing devices 110. The server system 102 may be a cloud computing environment, according to some example embodiments. The server system 102, and any servers associated with the server system 102, may be associated with a cloud-based application, in some example embodiments.

The server system 102 may include an application program interface (API) server 118, a web server 122, and an application server 120, that may be communicatively coupled with one or more databases 126. Databases 126 may be storage devices that store information such as application data, user data, and the like. The API server 118 may be used by third party servers or other computing devices to interact with server system 102 via a programmatic interface provided by the API server 118. For example, computing devices may request and utilize information from the server system 102 via the API server 118 to support one or more features or functions on a website hosted by the third party or an application hosted by the third party. The third party website or application may provide capabilities that that are supported by relevant functionality and data in the server the system 102.

Figure 1B:
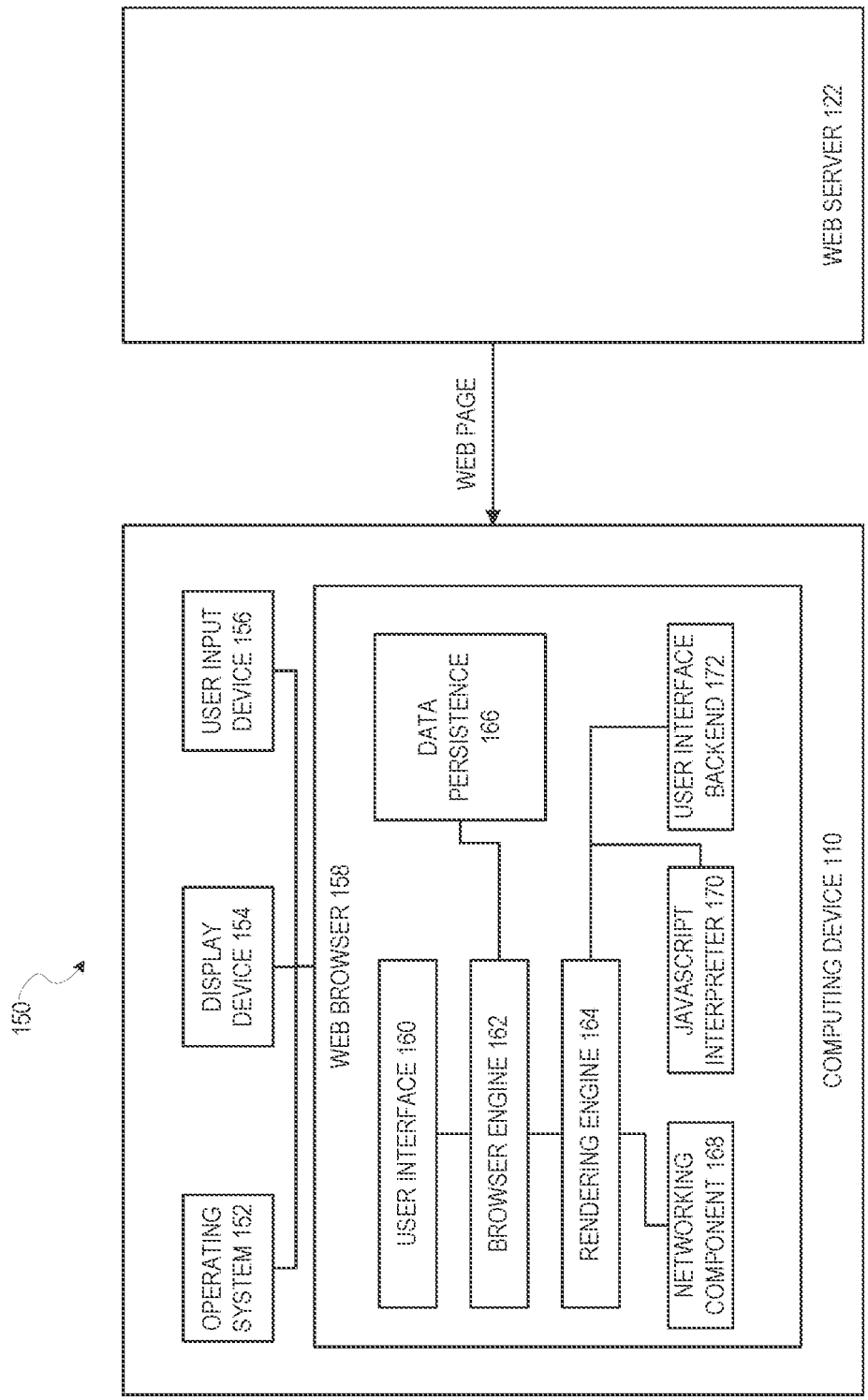
FIG. 1B is a block diagram illustrating a system including a web browser, according to some example embodiments.

FIG. 1B is a block diagram illustrating a system 150 including further details of the computing device 110 and the web server 122 shown in FIG. 1A. The system 150 includes a web browser 158, according to some example embodiments. The system 150 represents one example system that can be used to implement the range slider control. In one example, the range slider is implemented as a JavaScript or similar scripting language element, executed in the web browser 158 on a computing device 110. Implementation of the range slider is not limited to JavaScript or similar scripting language element, and other systems may be used to implement the range slider.

The computing device 110 may be, for example, a desktop computer, laptop computer, tablet computer, smart phone, smart watch, or any other computing device capable of displaying a GUI via a scripting language and web browser combination. It should be noted, however, that in fact the further systems described later need not be limited to those computing devices capable of displaying a GUI via a scripting language and web browser combination and can, in fact, include any computing devices capable of displaying a GUI.

The system 150 includes the computing device 110 as well as a web server 122. The web server 122 delivers a web page to the computing device 110 upon request. This request may either be explicit by the user of the computing device 110, such as by navigating the web browser 158 to a specific web address, or may be implicit or automatic. The web page may, for example, be in the form of Hypertext Markup Language (HTML) code or other markup language code, which may incorporate various calls and/or scripts through languages such as Cascading Style Sheets (CSS) and JavaScript.

An operating system 152 on the computing device 110 controls interactions between the web browser 158 and a user input device 156. In other words, the operating system 152 can detect when a user interacts with the web browser 158 via input to the user input device 156 and transmit such interactions to the web browser 158. Examples of user input devices 156 include mice, keyboards, touchpads, touchscreens, microphones, and any other devices capable of receiving user input. The web browser 158 can output rendered GUI elements on a display device 154 of the computing device 110. In some example embodiments, the display device 154 and the user input device 156 are the same device, such as in the case of a touchscreen.

The web browser 158 contains its own user interface 160 (which may display, for example, an address bar, back/forward button, bookmarking menu, etc.). A browser engine 162 marshals actions between the user interface 160 and a rendering engine 164. The rendering engine 164 is responsible for rendering content (e.g., web pages). The rendering engine 164 may contain one or more specialized parsers (e.g., HTML parser, CSS parser) for this purpose.

A networking component 168 handles calls such as Hypertext Transfer Protocol (HTTP) to and from the web server 122, using different implementations based on the platform, and typically behind a platform-independent interface. A user interface backend 172 handles drawing basic web page components such as buttons and windows. A JavaScript interpreter 170 is used to parse and execute JavaScript code found in a web page parsed by the rendering engine 164. Finally, a data persistence layer 166 allows the web browser 158 to save various types of data locally, such as cookies.

In an example embodiment, specialized JavaScript code is provided to the JavaScript interpreter 170, either via a downloaded web page or by directly modifying one or more JavaScript libraries utilized by the JavaScript interpreter 170, which causes modification of a range slider GUI element in the user interface backend 172. This modification causes the corresponding range slider element to, when displayed, act in a dynamic manner in response to a user action to select, move, or otherwise interact with the range slider in the GUI.

Figure 2A:
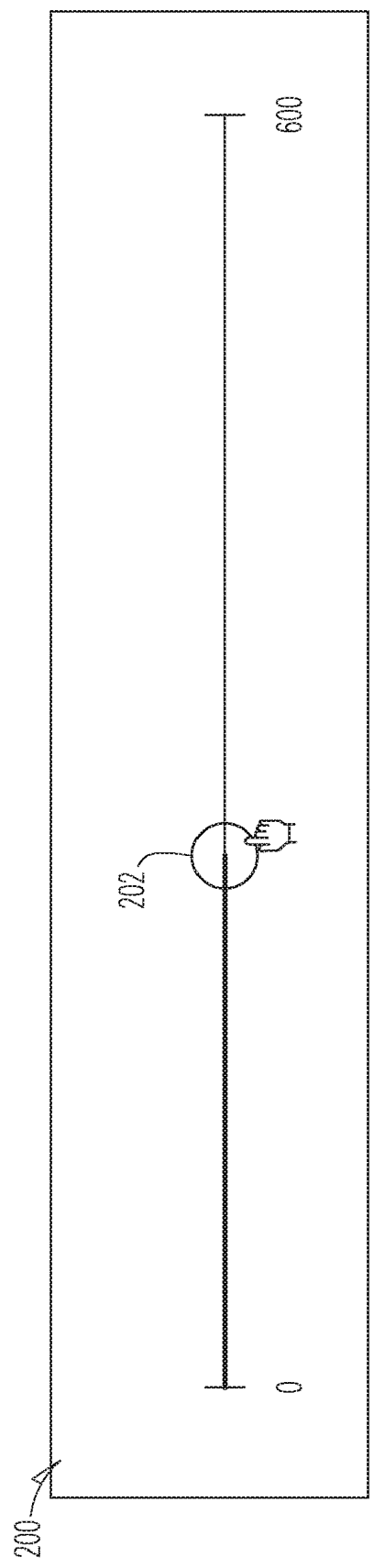
FIGS. 2A-2D illustrate example sliders, according to some example embodiments.
Figure 2B:
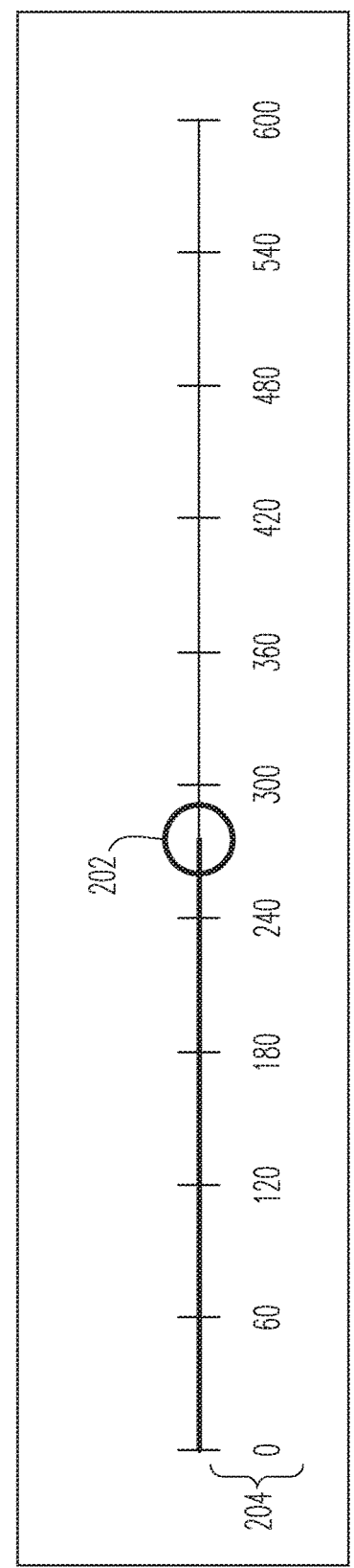
Figure 2C:
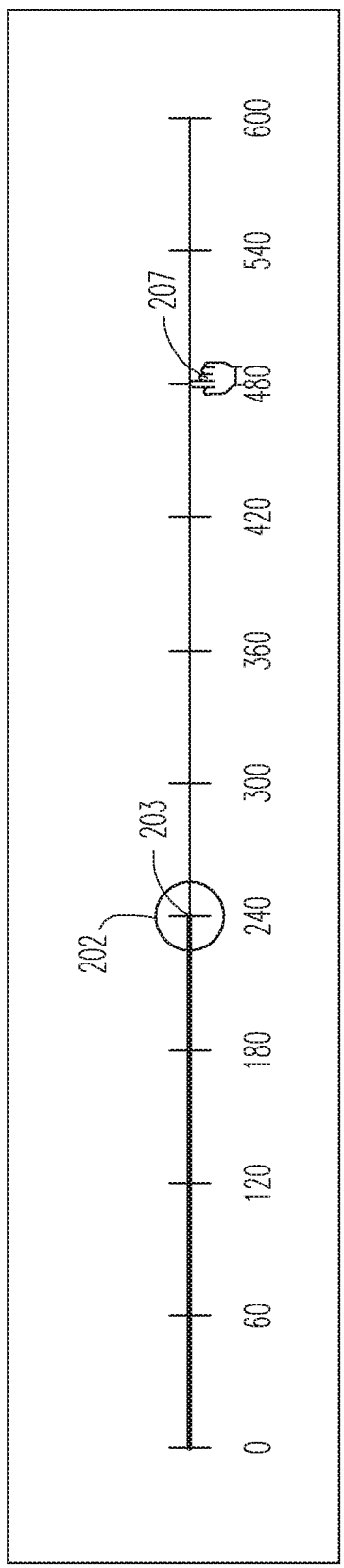
Figure 2D:
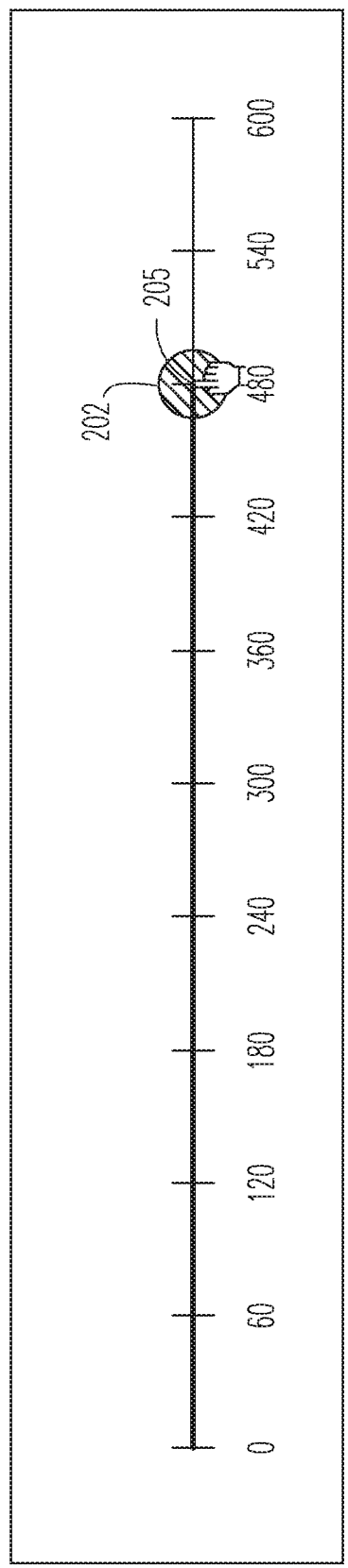

As explained above, a range slider may be used in many applications for specifying an interval of values (e.g., a certain price span that may be used as an input/trigger for further functionality, such as displaying only products with a price within the price span). An example of a single slider control is shown in FIG. 2A and FIG. 2B. FIG. 2A shows a single slider control 200 that gives a user the ability to select a certain value of a finite value set (e.g., between 0 and 600) by moving a handle 202. The handle 202 is shown in FIG. 2A as a circle, but is not limited to the shape and size shown in FIG. 2A. For example, the handle could be in other shapes and formats. Depending on the value set (e.g., price, dates, sound volume, etc.), it may be useful to show some tick marks and labels 204 displaying the value related to the bar position, as shown in FIG. 2B. Interaction with the slider control may be available by selecting (e.g., using an input device (e.g., mouse, touch pad, etc.) touching a touchscreen, etc.) a handle 202 or a location on the bar and taking this position as a start point for moving the location of the handle 202. For example, this may be done via a dragging operation until the selection is released (e.g., mouse button release, finger lifted off of touch screen, etc.) or by selecting a location to move the handle 202 (e.g., clicking or touching a location on the bar outside the handle). In one example, a user may select the handle 202 at a first position or location 203 shown in FIG. 2C and drag it to a second position or location 205, as shown in FIG. 2D. In another example, the user may select a location 207 for the handle 202 to move to, as shown in FIG. 2C, and the handle would be moved to that location, as shown in FIG. 2D.

Functions of a range slider may be called either during the user interaction with the range slider (e.g., for quick responding functions such as changing a sound volume) or after completion of the user interaction.

Figure 3A:
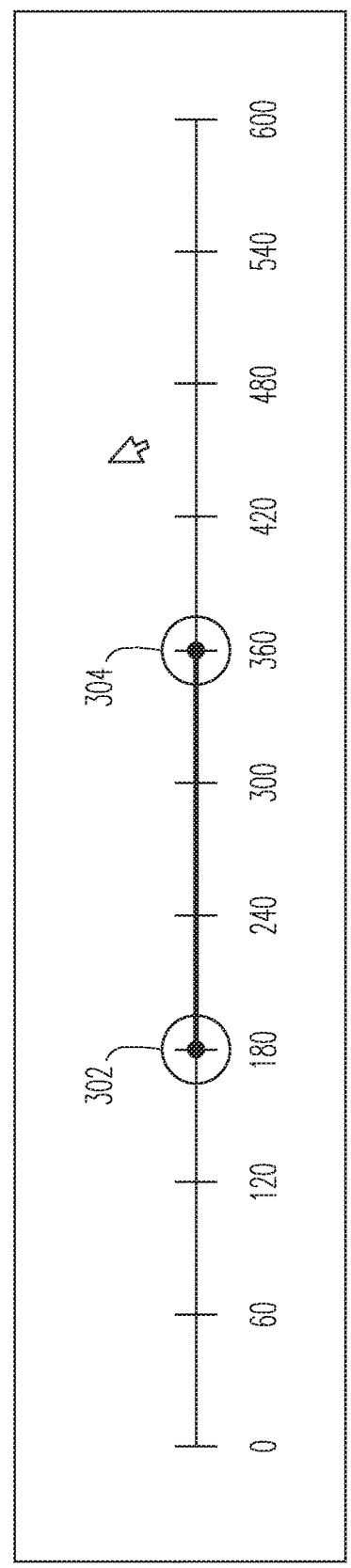

In some use cases, a user may want to select a whole interval of values, bounded by two values. Accordingly, an application may provide a range slider control 300 that includes two handles 302 and 304, as shown in FIG. 3A.

There are several design considerations for behavior of a range slider based on user interaction. One consideration is what behavior should occur when a user selects a location between two handles. FIG. 3B and FIG. 3C illustrate moving the closer handle to the selected location. For example, a user may select a location 308 using an input device (e.g., a mouse, touchpad, etc.) or via a touch screen. The computing device may determine that handle 310 is closer to the location 308 than handle 306 and thus, move the closer handle 310 to the location 308, as shown by reference number 312. Another method may be to move the handle that was last used by the user. These methods, however, may lead to unpredictable results for a user. For example, precise movements on a touch screen using a finger may be difficult, and thus, a user accessing a touch screen may not be able to be very precise on the location for the handle. Accordingly, a handle that the user did not want to move may be the one moved to the location desired by the user.

Figure 3D:
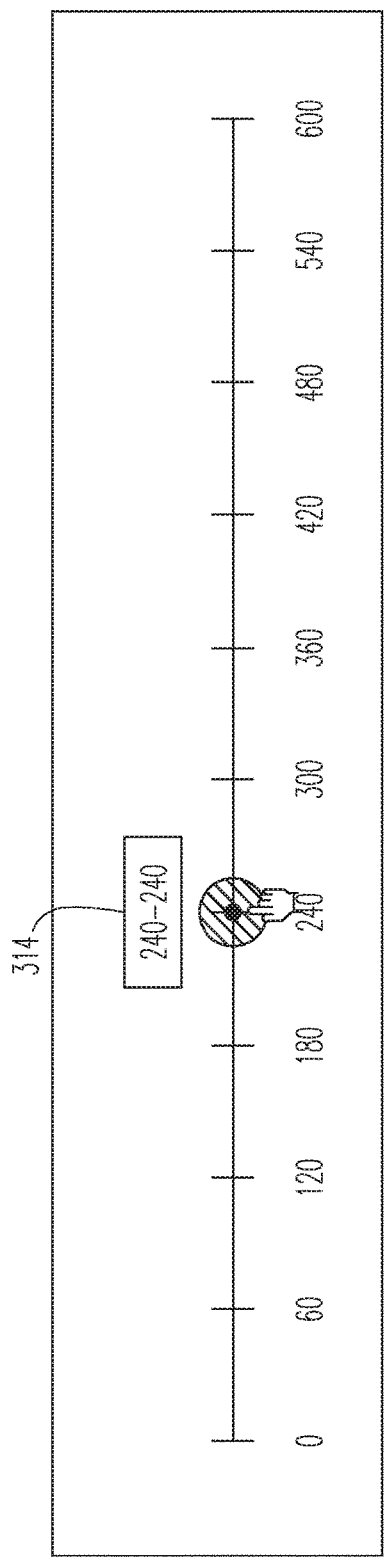
Figure 3E:
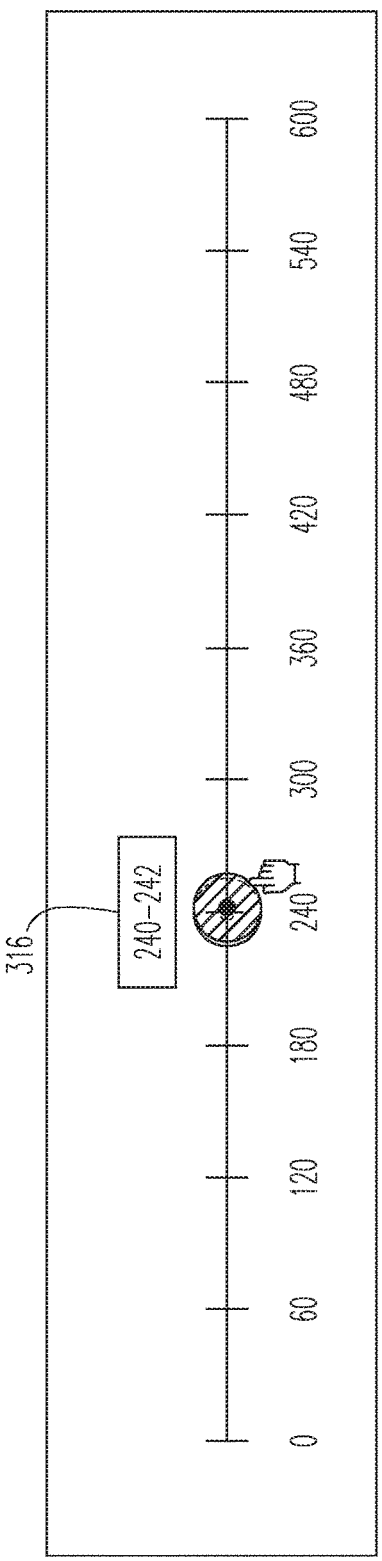

Another design consideration is what behavior should occur when the two handles are close to each other or at the same position. When the two handles are close to each other or at the same position, the area of interaction for the left handle and the right handle may be difficult to access when the distance between the left handle and the right handle is too narrow (e.g., the left handle and right handle are touching, overlapping, or in the same position). One method is to simply provide textual information in a tooltip 314 or 316, as shown in FIG. 3D and FIG. 3E. Embodiments described herein provide an extended interaction area so that the left handle and the right handle may be independently accessed in such a scenario.

Figure 3F:
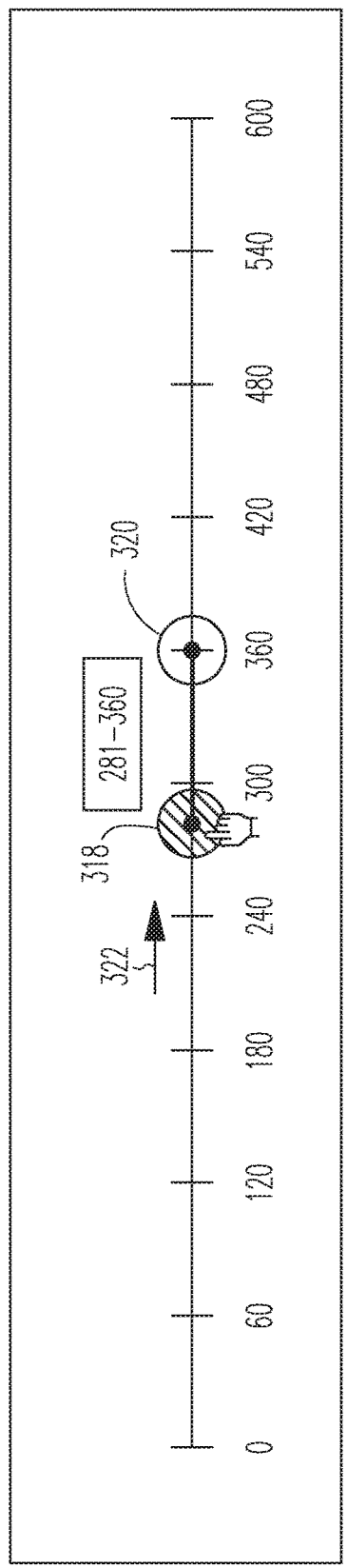
Figure 3G:
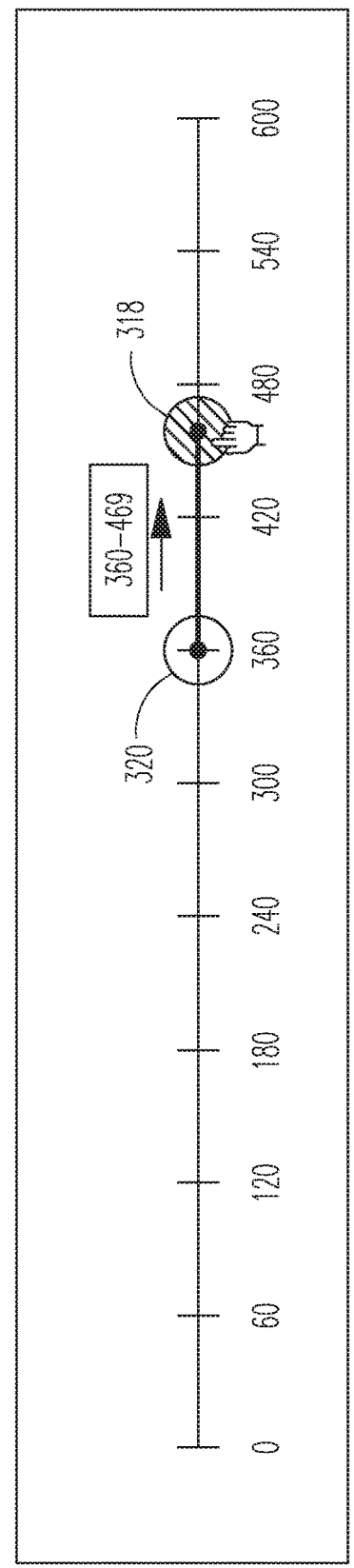
Figure 3H:
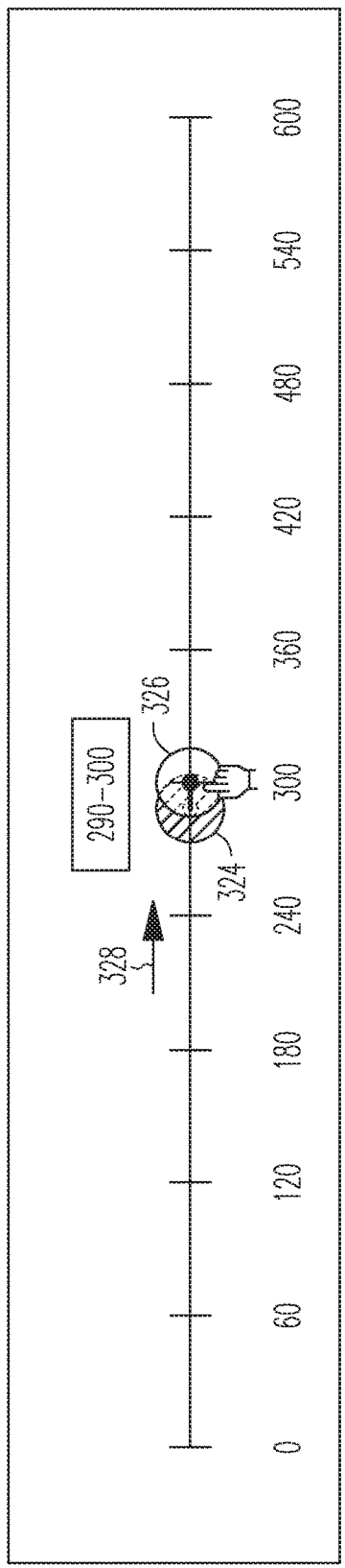
Figure 3I:
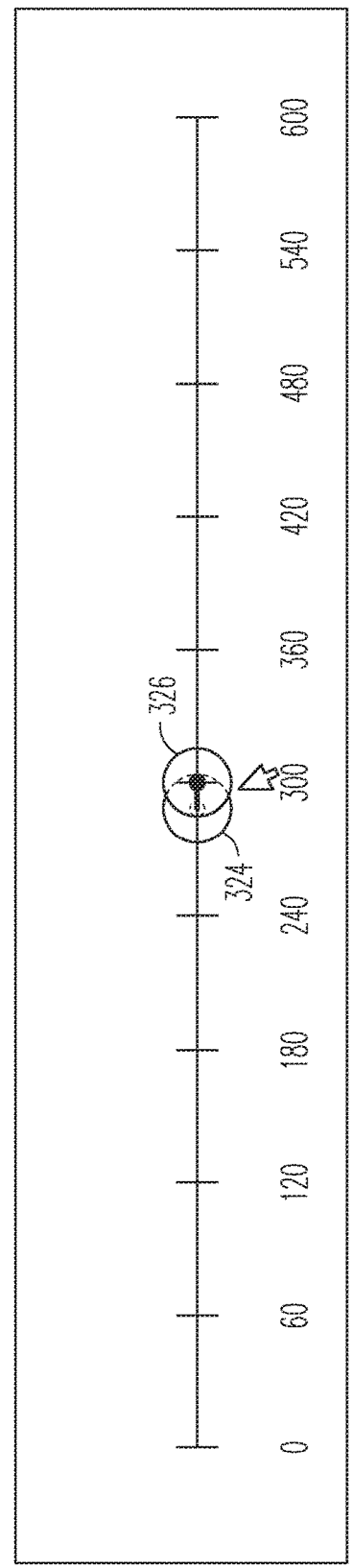

Yet another design consideration is what should happen if one handle is dragged beyond the other handle. One method is to switch the handles' positions when one handle 318 is dragged past another other handle 320, as shown in FIG. 3F and FIG. 3G. For example, a user may select a handle 318 and move it in a first direction 322, as shown in FIG. 3F. The user may continue to move the handle 318 past the handle 320, as shown in FIG. 3G. This method may be confusing to users and moves away from the metaphor of a slider. Another method may be to prevent one handle from being dragged past or beyond the other handle by stopping the movement of the moving handle at the position of the other handle. This scenario is illustrated in FIGS. 3H-3J. For example, a user may move a left handle 324 in a direction of movement 328 towards a right handle 326, as shown in FIG. 3H. The left handle 324 may be stopped when it is on the same position as the right handle 326, and shown as on or near the right handle 326 as shown in FIG. 3H. This method causes a problem with overlapping of the two handles and how to further interact with the handles. In some frameworks, the right handle is statically always "above" the left handle, which allows a user to move the left handle "below" the right handle, as shown in FIG. 3J. It may be cumbersome, or may even not possible, to click on the left handle again for a next interaction. This may be particularly problematic when using a touch screen where movement and location may be less precise than using an input device.

Another design consideration is allowing movement of the range of the slider, thus preserving the distance between the left handle and the right handle. Conventionally, this functionality has not been provided. Instead, a user must move each handle of the range slider separately.

These design considerations and other design considerations are taken into account, individually and collectively, in various example embodiments described herein.

Figure 4:
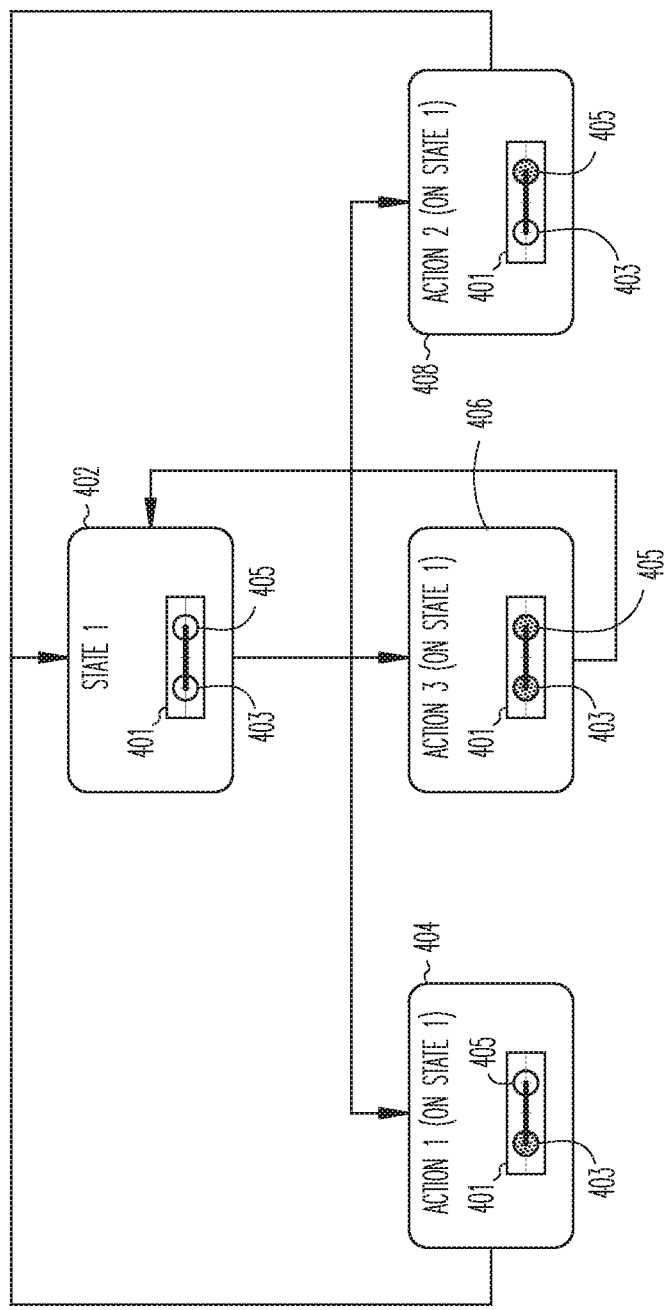
FIG. 4 is a block diagram illustrating behavior of a range slider control, according to some example embodiments.

FIG. 4 is a block diagram, according to some example embodiments, illustrating behavior of a range slider control when a user selects and moves a left handle, selects and moves a right handle, or selects a location between the left handle and the right handle. State 1 (402) shows a range slider 401 comprising a left handle 403 and a right handle 405. The left handle 403 and the right handle 405 may be separated by a distance greater than a predetermined threshold distance. For example, the predetermined distance may be such that the left handle 403 and the right handle 405 are not touching or overlapping. In one example, the predetermined threshold distance is a distance greater than where the left handle 403 and right handle 405 are touching or overlapping. In another example, the predetermined threshold distance may be a specific measurement between a right edge of a left handle 403 and a left edge of a right handle 405 (e.g., 0.5 inch, 1 inch, 1.25 inches, etc.). For example, it may be determined that when the left handle 403 and the right handle 405 are closer than the specific measurement, it is difficult for a user to select a handle using a touchscreen.

Action 1 (404) illustrates a user interaction with the range slider where the user selects the left handle 403 of the range slider 401. The selected handle (e.g., left handle 403) may be highlighted to indicate that it has been selected by the user. The selected handle may then be moved in a direction desired by the user (e.g., left or right).

Action 2 (408) illustrates a user interaction with the range slider where the user selects the right handle 405 of the range slider 401. The selected handle (e.g., right handle 405) may be highlighted to indicate that it has been selected by the user. The selected handle may then be moved in a direction desired by the user (e.g., left or right).

Figure 5A:
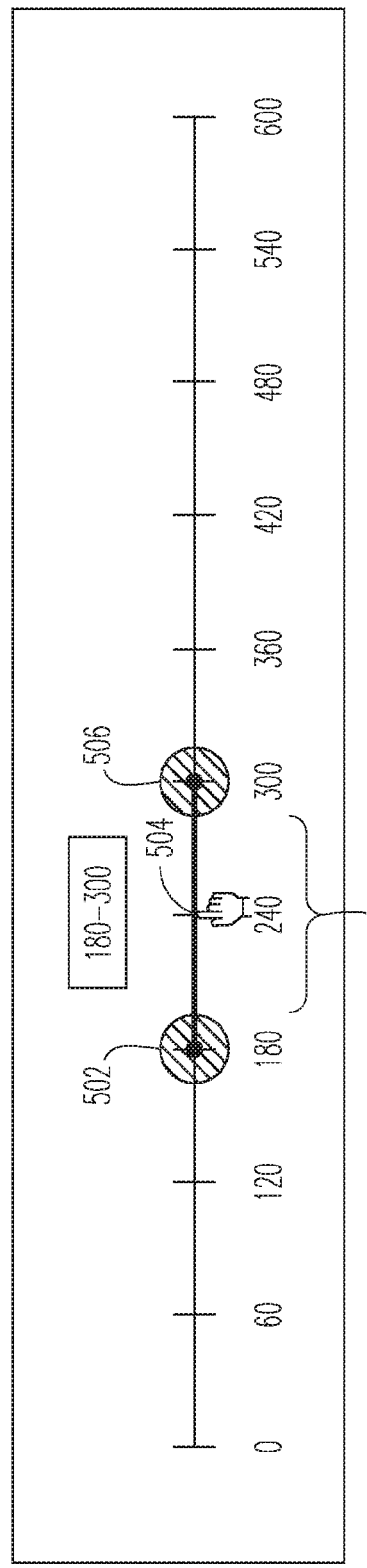
FIGS. 5A-5B illustrate example range sliders, according to some example embodiments.
Figure 5B:
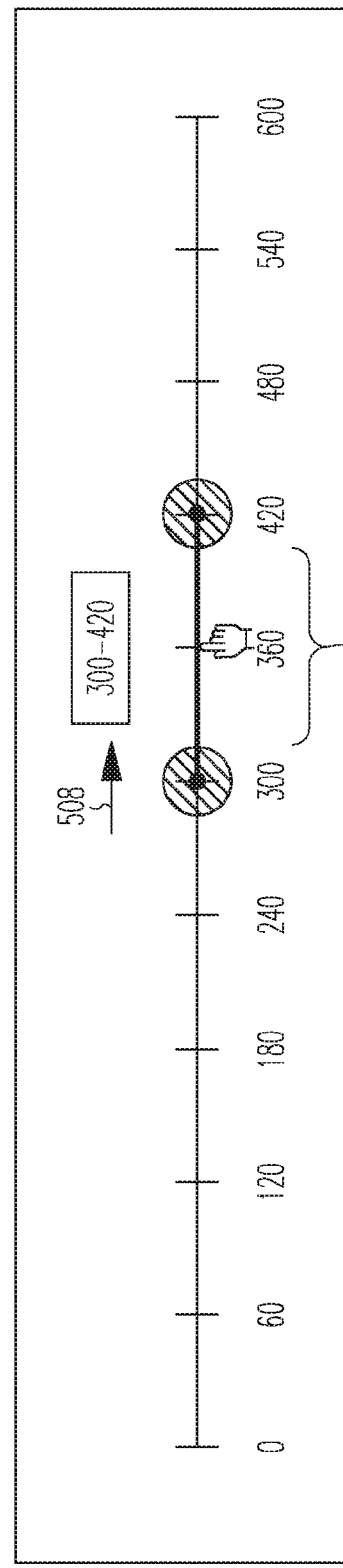

Action 3 (406) illustrates a user interaction with the range slider where the user selects a location in between the left handle 403 and the right handle 405 of the range slider 401. For example, the location may be in between the right edge of the left handle 403 and the left edge of the right handle 405. Based on the user selection of a location in between the left handle 403 and the right handle 405 of the range slider 401, both the left handle 403 and the right handle 405 may be highlighted to indicate that the range of the left handle and the right handle may be moved in the direction desired by the user. For example, the distance between the left handle 403 and the right handle 405 stays constant such that the range may be moved to the left or to the right. Accordingly, the range may be moved in the direction of movement of the user interaction (e.g., left or right). This is illustrated in FIG. 5A and FIG. 5B. A user may select a location 504 in between a left handle 502 and a right handle 506, as shown in FIG. 5A. The user may then drag the range in the direction of movement 508 such that the entire range moves in the direction of movement, as shown in FIG. 8B.

Figure 6:
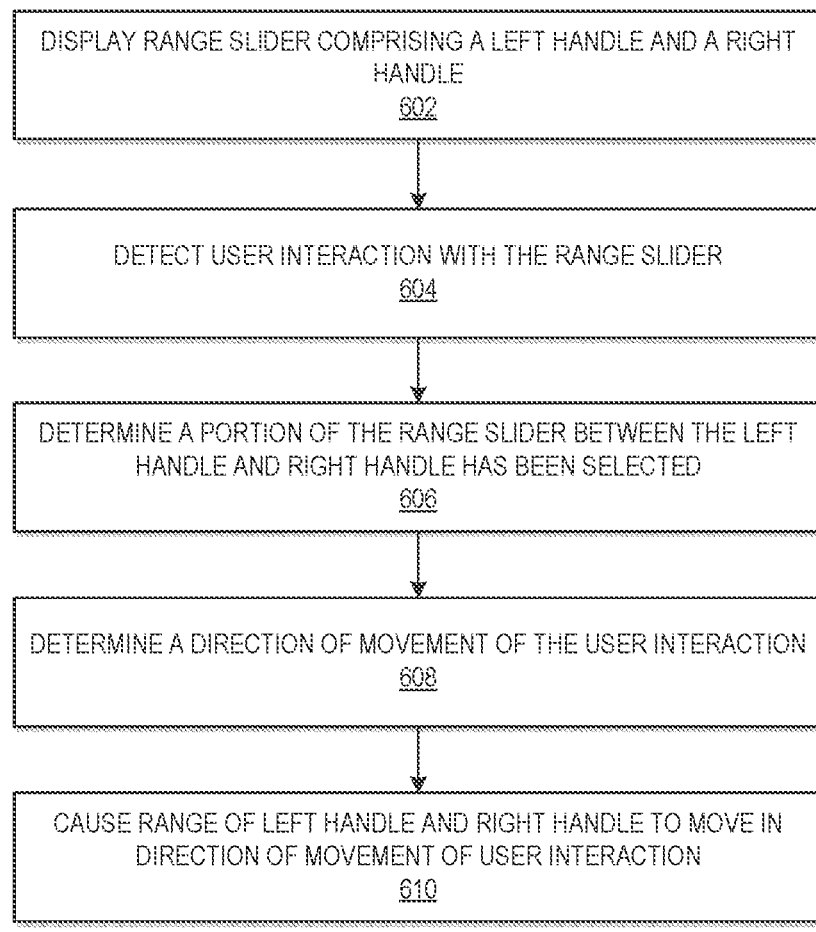
FIG. 6 is a flowchart illustrating aspects of a method, according to some example embodiments.

FIG. 6 is a flow chart illustrating aspects of a method 600, according to some example embodiments, for behavior of a range slider control based on user interaction. For illustrative purposes, method 600 is described with respect to the networked system 100 of FIG. 1 and the example range slider in FIGS. 5A and 5B. It is to be understood that method 600 may be practiced with other system configurations in other embodiments.

In operation 602, a computing device (e.g., computing device 110) displays a range slider 500 on a display or user interface of the computing device. The range slider may comprise a left handle 502 and a right handle 506. In one example embodiment, the left handle 502 and the right handle 506 are separated by a distance greater than a predetermined threshold distance (as described above).

At operation 604, the computing device detects a user interaction (e.g., via a touch screen or input device) with the range slider. For example, a user may use a mouse to move a pointer to the range slider and press a button or other control on the mouse to select a location on the range slider, or may touch a touch screen to select a location on the range slider.

At operation 606, the computing device determines, based on the user interaction, that a portion of the slider in between the left handle and the right handle has been selected (e.g., 504 of FIG. 5A). For example, a user interaction may comprise a first user interaction to select the portion of the slider, and a second user interaction to move or drag the selected portion. At operation 608, the computing device determines a direction of movement 508 (e.g., left or right) of the second user interaction. And at operation 610, the computing device causes the distance 510 between the left handle and the right handle to stay constant such that the range of the left handle and the right handle moves in the direction of movement of the second user interaction (as shown in FIG. 5B). In one example, the computing device may cause the range of the left handle and right handle to be highlighted.

Figure 7A:
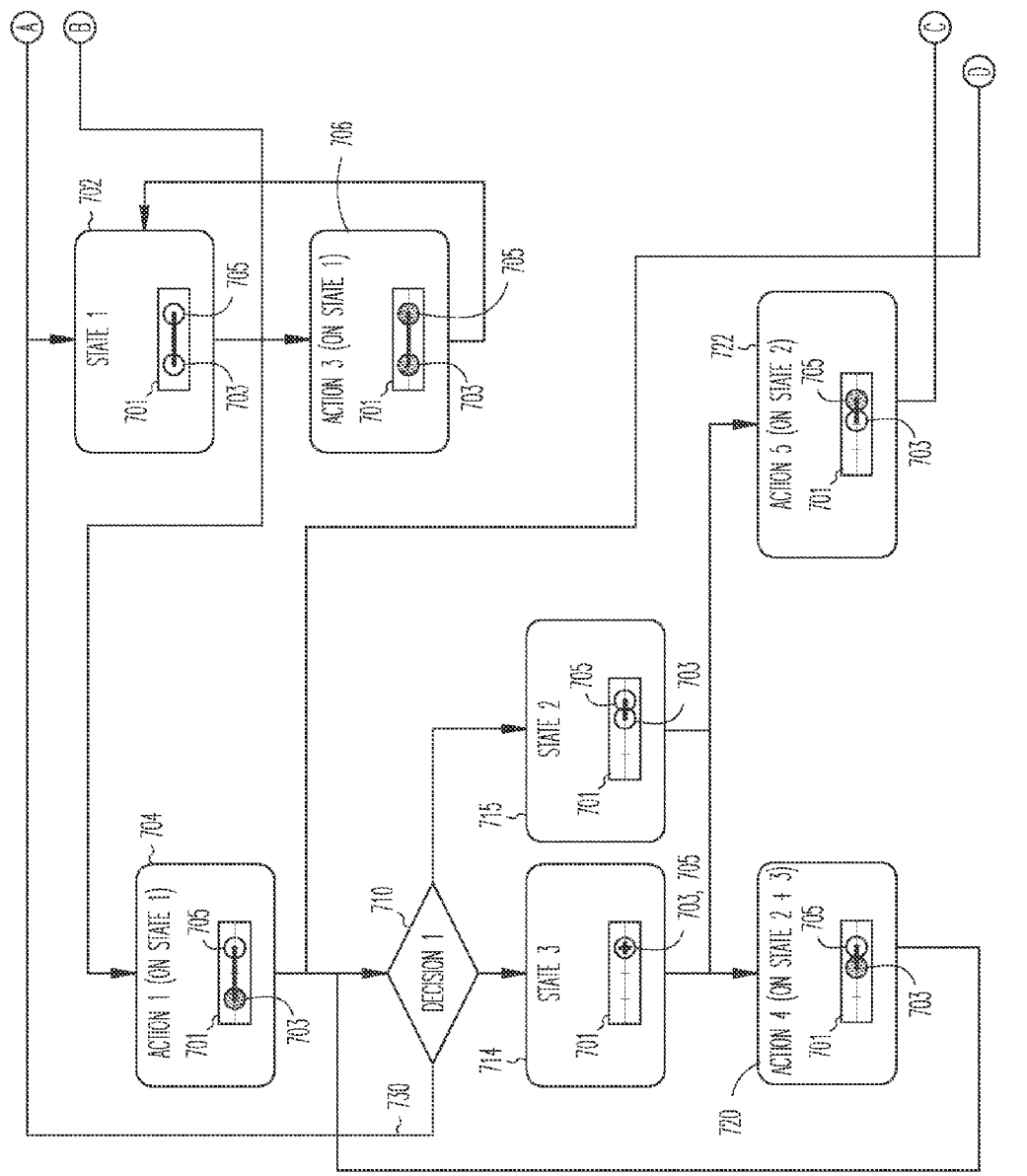
FIGS. 7A-7B show a block diagram illustrating behavior of a range slider control, according to some example embodiments.
Figure 7B:
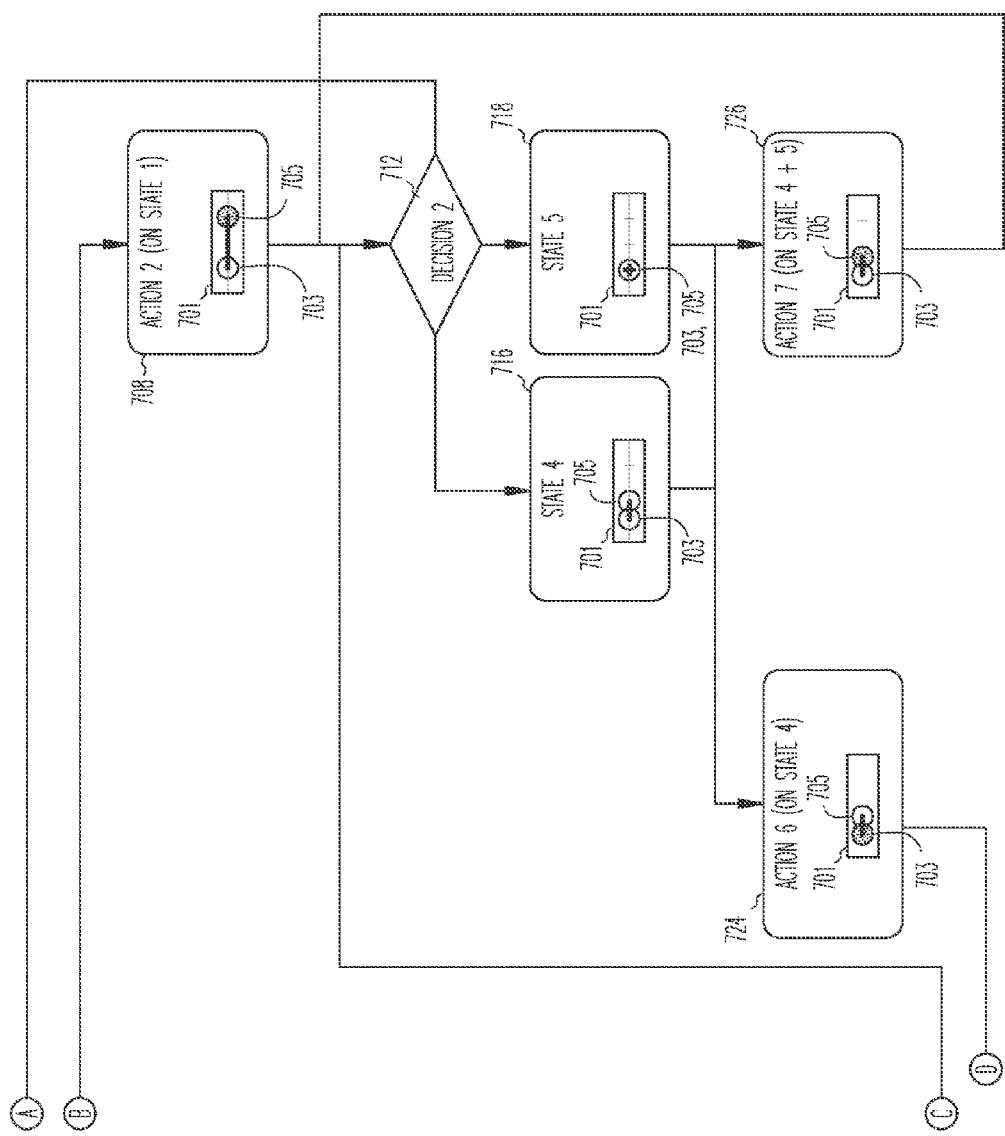

FIGS. 7A-7B show a block diagram, according to some example embodiments, illustrating behavior of a range slider control when a user moves a left handle 703, a right handle 705, or a location between the left handle 703 and the right handle 705. For readability, the block diagram shown in FIGS. 7A-7B has been split into two pages (e.g., FIG. 7A is the left half of the figure and FIG. 7B is the right half of the figure). Reference letters A-D on each half indicate where the two halves intersect.

State 1 (702), action 1 (704), action 2 (708), and action 3 (706) are similar to what is described above for FIG. 4 with respect to state 1 (402), action 1 (404), action 2 (406), and action 3 (408). Accordingly, that description will not be repeated here.

Decision 1 (710) comes from a user interaction with the left handle 703 of the range slider 701 to move the left handle 703. In decision 1 (710), the selected handle is the left handle.

For decision 1 (710), a first case is where the left handle 703 and the right handle 705 of the range slider 701 are separated by a distance greater than a predetermined threshold distance (as explained above). This case 730 would lead back to state 1 (702). A second case is where the left handle 703 and the right handle 705 are not separated by a distance greater than a predetermined threshold distance, but are not equal. For example, the left handle 703 and the right handle 705 may be touching or overlapping somewhat, but not overlapping entirely. This is shown in state 2 (715).

A third case is where the left handle 703 and the right handle 705 are equal. This is shown in state 3 (714) as a single handle. In one example, a visual indication may be provided to show that both handles are at the same position. In the example in state 3 (714), the indication is in the form of a cross or plus symbol. This third case is shown in FIG. 7C and FIG. 7D. As illustrated in FIG. 7C and FIG. 7D, a user selects 734 the right handle 736 and moves it in a direction 738 towards the left handle 732, until the right handle 736 is in the same position as the left handle 732, as shown in FIG. 7D. In one example, the user may try to move the right handle 736 past the left handle 732, but the computing device would cause the right handle 736 to stop at the same position of the left handle 702 such that it could not be moved past the left handle 732.

Returning to FIGS. 7A-7B, decision 2 (712) comes from a user interaction with the right handle 705 of the range slider 701 to move the right handle 705. In decision 2 (712), the selected handle is the right handle 705.

For decision 2 (712), a first case is where the left handle 703 and the right handle 705 of the range slider 701 are separated by a distance greater than a predetermined threshold distance (as explained above). This case would lead back to state 1 (702). A second case is where the left handle 703 and the right handle 705 are not separated by a distance greater than a predetermined threshold distance, but are not equal. For example, the left handle 703 and the right handle 705 may be touching or overlapping somewhat, but not overlapping entirely. This is shown in state 4 (716). A third case is where the left handle 703 and the right handle 705 are equal. This is shown in state 5 (718) as a single handle. In one example, a visual indication may be provided to show that both handles are at the same position. In the example in state 5 (718), the indication is in the form of a cross or plus symbol.

In state 2 (715), action 4 (720) is a user interaction to move the left handle 703. The result of this interaction would lead back to decision 1 (710). Action 5 (722) is a user interaction to move the right handle 705 (if the right handle 705 is accessible). The result of this interaction would lead to decision 2.

In state 3 (714), action 4 (720) is a user interaction to move the left handle 703. The result of this interaction would lead back to decision 1 (710). The right handle 705 in state 3 (714) is not accessible in this example, and so action 5 (722) does not apply, In state 4 (716), action 6 (724) is a user interaction to move the left handle 703, the result of which leads back to decision 1 (710). Action 7 (726) is a user interaction to move the right handle 705, the result of which leads back to decision 2 (712).

In state 5 (718), the left handle 703 is not accessible in this example, and so action 6 (724) does not apply. Action 7 (726) is a user interaction to move the right handle 705, the result of which leads back to decision 2 (712).

Figure 8:
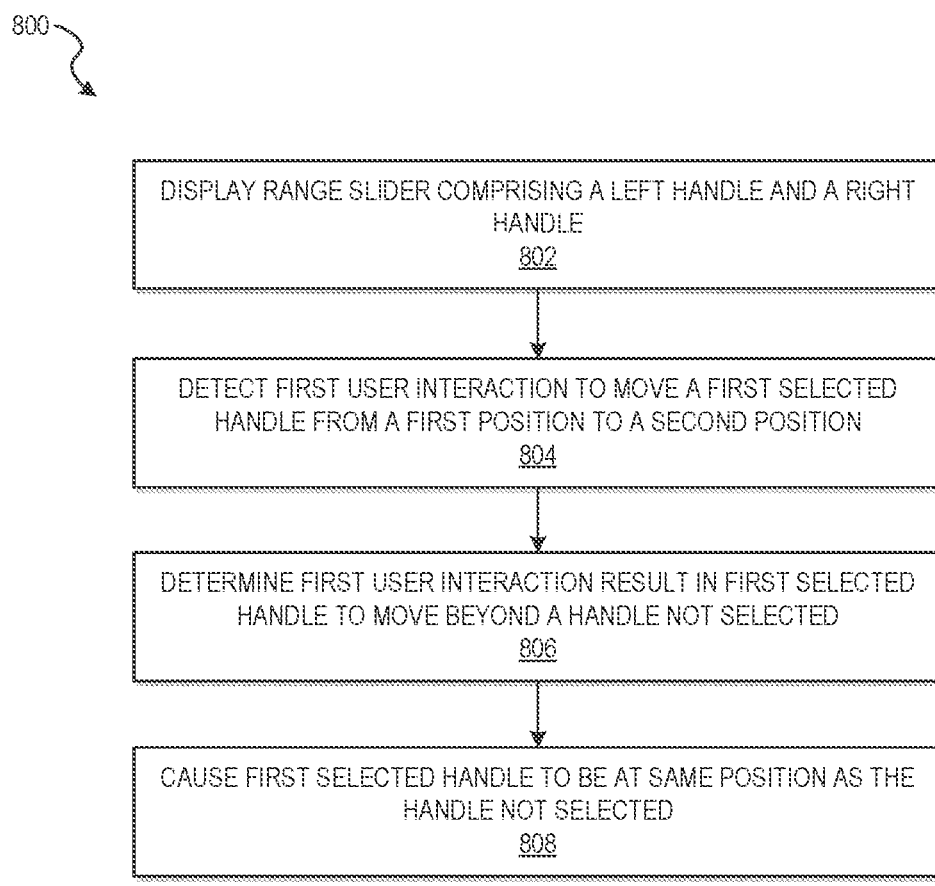
FIG. 8 is a flowchart illustrating aspects of a method, according to some example embodiments.

FIG. 8 is a flow chart illustrating aspects of a method 800, according to some example embodiments, for behavior of a range slider control based on user interaction. For illustrative purposes, method 800 is described with respect to the networked system 100 of FIG. 1 and the example range sliders in FIGS. 7C and 7D. It is to be understood that method 800 may be practiced with other system configurations in other embodiments.

In operation 802, a computing device (e.g., computing device 110) displays a range slider 731 on a display or user interface of the computing device, as shown in FIGS. 7C and 7D. The range slider may comprise a left handle 732 and a right handle 736. In one example embodiment, the left handle 732 and the right handle 736 are separated by a distance greater than a predetermined threshold distance (as described above).

At operation 804, the computing device detects a first user interaction (e.g., via a touch screen or input device) with the range slider to move a first selected handle from a first position to a second position. For example, a user may use a mouse to move a pointer to the range slider and press a button or other control on the mouse to select the left handle 732 or the right handle 736, or may touch a touch screen to select the left handle 732 or the right handle 736.

At operation 806, the computing device determines that the first user interaction would result in the first selected handle to move beyond a handle not selected. For example, the user may select the right handle 736 (e.g., the first selected handle) and attempt to move it beyond the left handle 732 (e.g., the handle not selected). Or, the user may select the left handle 732 (e.g., the first selected handle) and attempt to move it beyond the right handle 736 (e g., the handle not selected). The computing device causes the first selected handle to be at a similar (e.g., touching or overlapping the handle not selected) or at the same position as the handle not selected, at operation 808. Thus, even though the user attempts to move the first selected handle beyond the handle not selected, the computing device would cause the first selected handle to stop at the same position as the handle not selected, as shown in FIG. 7D. The computing device may cause an indication to be displayed to indicate that both the left handle and the right handle are at the same position. In the example in FIG. 7D, the indication is in the form of a cross or plus symbol.

At the next user interaction, the computing device may determine that the second position results in a distance less than the predetermined threshold distance. The computing device may detect a second user interaction to move a second selected handle and determine an initial direction of movement of the second selected handle. The computing device may cause the second selected handle to move in the initial direction of movement based on a determination that the second selected handle is the left handle and the initial direction is to the left, or that the second selected is the right handle and the initial direction of movement is to the right. In other words, the second selected handle will move in the initial direction of movement when the initial direction of movement is a direction away from the handle that is not selected, In another example, the computing device may cause the distance between the left handle and the right handle to stay constant such that the range of the left handle and the right handle moves in the direction of movement of the second selected handle based on a determination that the second selected handle is the left handle and the initial direction is to the right, or that the second selected is the right handle and the initial direction of movement is to the left. In other words, the distance between the left handle and the right handle has to stay constant and both handles will move in the initial direction of movement when the initial direction of movement is a direction towards the handle that is not selected.

In another example, only the last used handle may allow the above interactions depending on the initial movement. For example, the computing device may determine that the second position results in a distance less than the predetermined threshold distance. The computing device may detect a second user interaction to move a second selected handle and determine that the second selected handle is the same as the first selected handle (e.g., the last used handle). The computing device may also detect an initial direction of movement of the second selected handle. Based on the determination that the second selected handle is the same as the first selected handle (e.g., the last used handle), the second selected handle will move in the initial direction of movement when the initial direction of movement is a direction away from the handle that is not selected (e.g., based on a determination that the second selected handle is the left handle and the initial direction is to the left, or that the second selected is the right handle and the initial direction of movement is to the right).

Figure 9B:
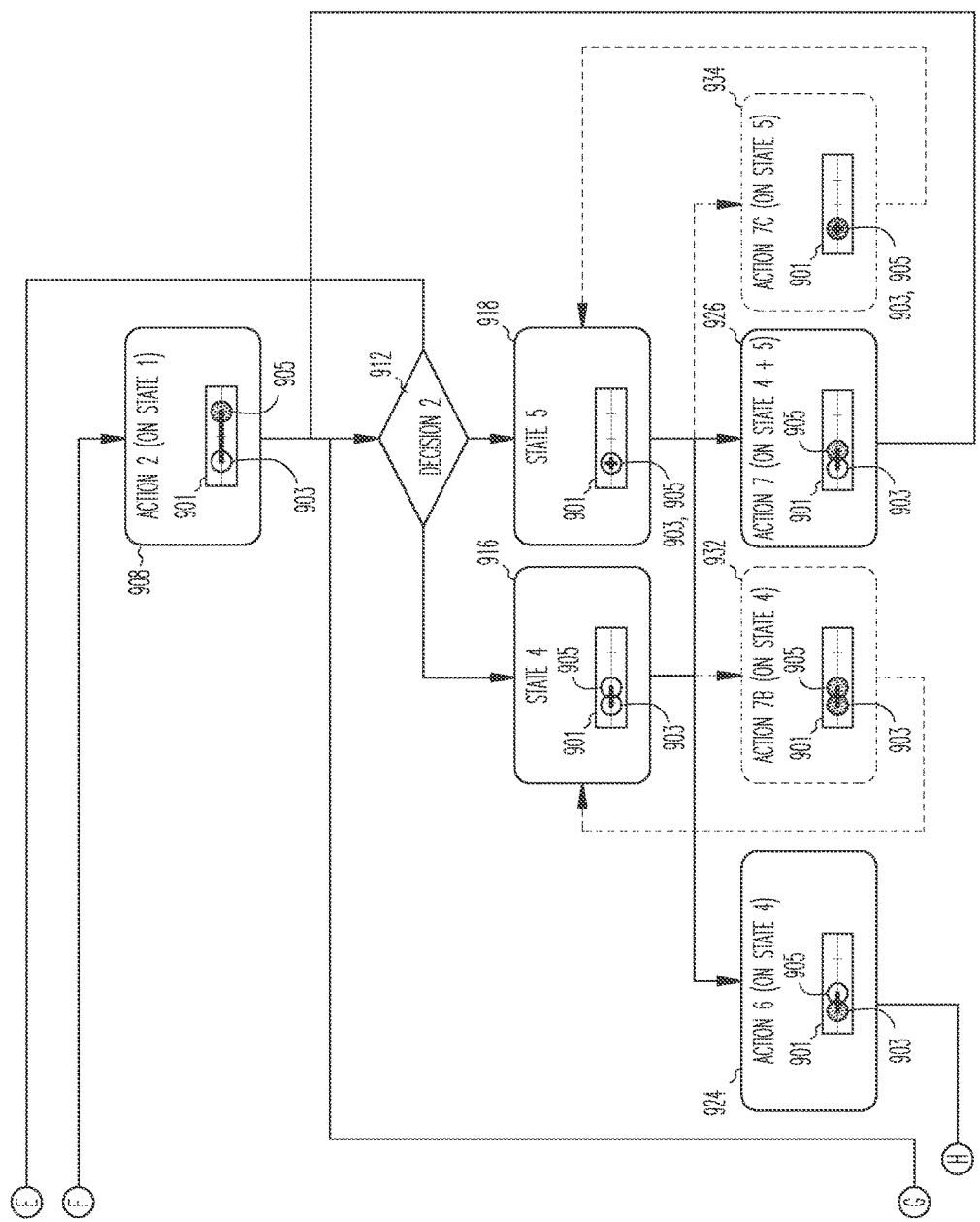

FIGS. 9A-9B show a block diagram, according to some example embodiments, illustrating behavior of a range slider control when a user moves a left handle, a right handle, or a location between the left handle and the right handle. For readability, the block diagram in FIGS. 9A-9B has been split into two pages (e.g., FIG. 9A is the left half of the figure and FIG. 9B is the right half of the figure). Reference letters E-H on each half indicate where the two halves intersect. The diagram of FIGS, 9A-9B is similar to the diagram of FIGS. 7A-7B, with additional actions shown with dotted lines and described below.

Figure 9C:
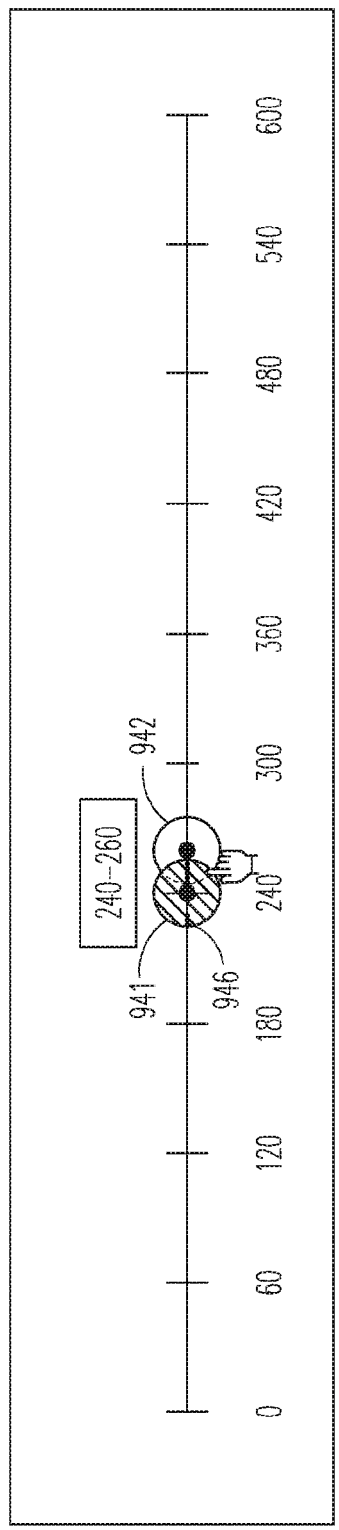
FIGS. 9C-9E illustrate example range sliders, according to some example embodiments.
Figure 9D:
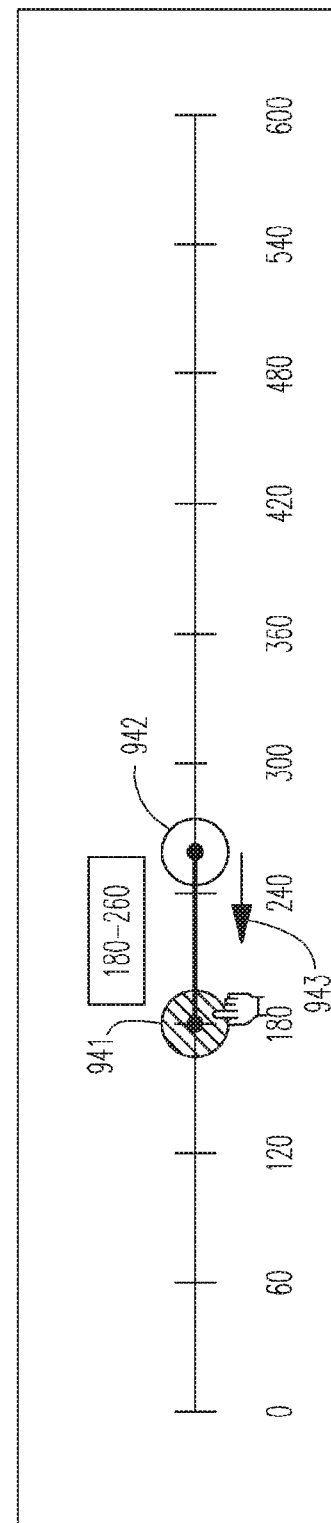
Figure 9E:
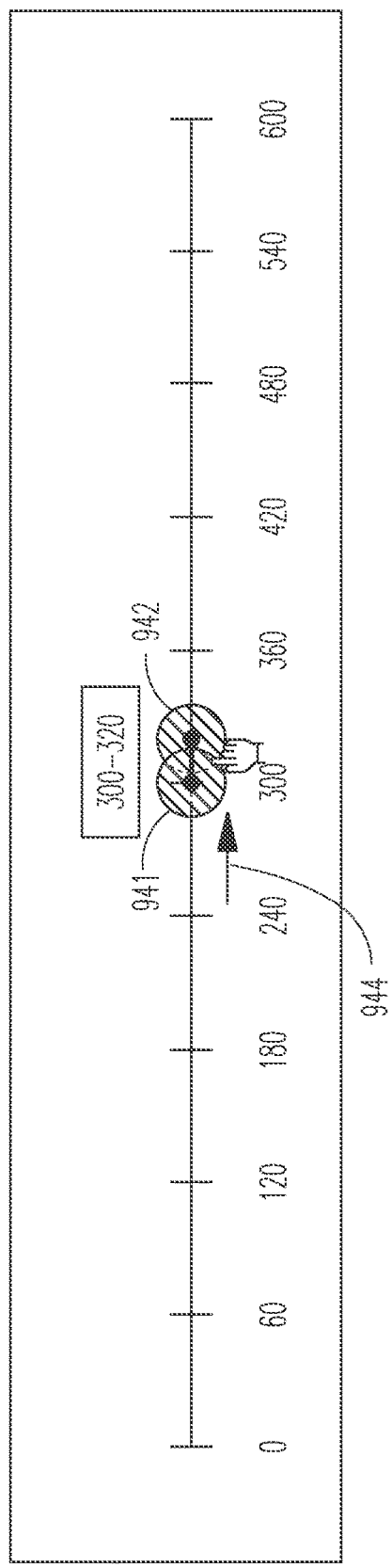

Action 4b (930) of state 2 (915) is a user interaction to move the left handle 903 to the right. This would cause the distance between the left handle and the right handle to stay constant such that the range of the left handle and the right handle moves in the direction of movement of the selected handle. Both the left handle and the right handle and/or the range of the left handle and the right handle may be highlighted to indicate that the range of the left handle and the right handle can be moved. An example of this is shown in FIGS. 9C-9E. For example, FIG. 9C shows a user interaction to select the left handle 941 and FIG. 9D shows a user moving the left handle 941 in a first direction of movement 943 (e.g., to the left). As illustrated in 9D, this will cause the left handle 941 to move to the left. The left handle 941 may be highlighted to indicate that it is selected. Also, an additional small bar 946 may be displayed to denote the direction of the single movement (e.g., that the left handle 941 may be moved to the left). FIG. 9E shows a user interaction moving the left handle 941 in a second direction of movement 943 (e.g., to the right). This will cause the distance between the left handle and the right handle to stay constant and both the left handle 941 and the right handle 942 to move together in the direction of movement 944 (e.g., to the right). The left handle 941 and the right handle 942 may be highlighted as shown in FIG. 9E to indicate that they can be moved together.

Returning to FIGS. 9A-9B, action 4c (928) is a user interaction to move the left handle 903 to the right. In this example, the left handle 903 and the right handle 905 are at the same position. The user interaction to move the left handle 903 to the right would cause the distance between the left handle and the right handle to stay constant (e.g., at the same position) such that the range of the left handle and the right handle moves in the direction of movement of the selected handle, as explained above.

Action 7b (932) and action 7c (934) are user interactions to move the right handle 903 to the left. As described above with respect to action 4b (930) and action 4c (938), this would cause the distance between the left handle and the right handle to stay constant such that the range of the left handle and the right handle moves in the direction of movement of the selected handle.

Figure 10:
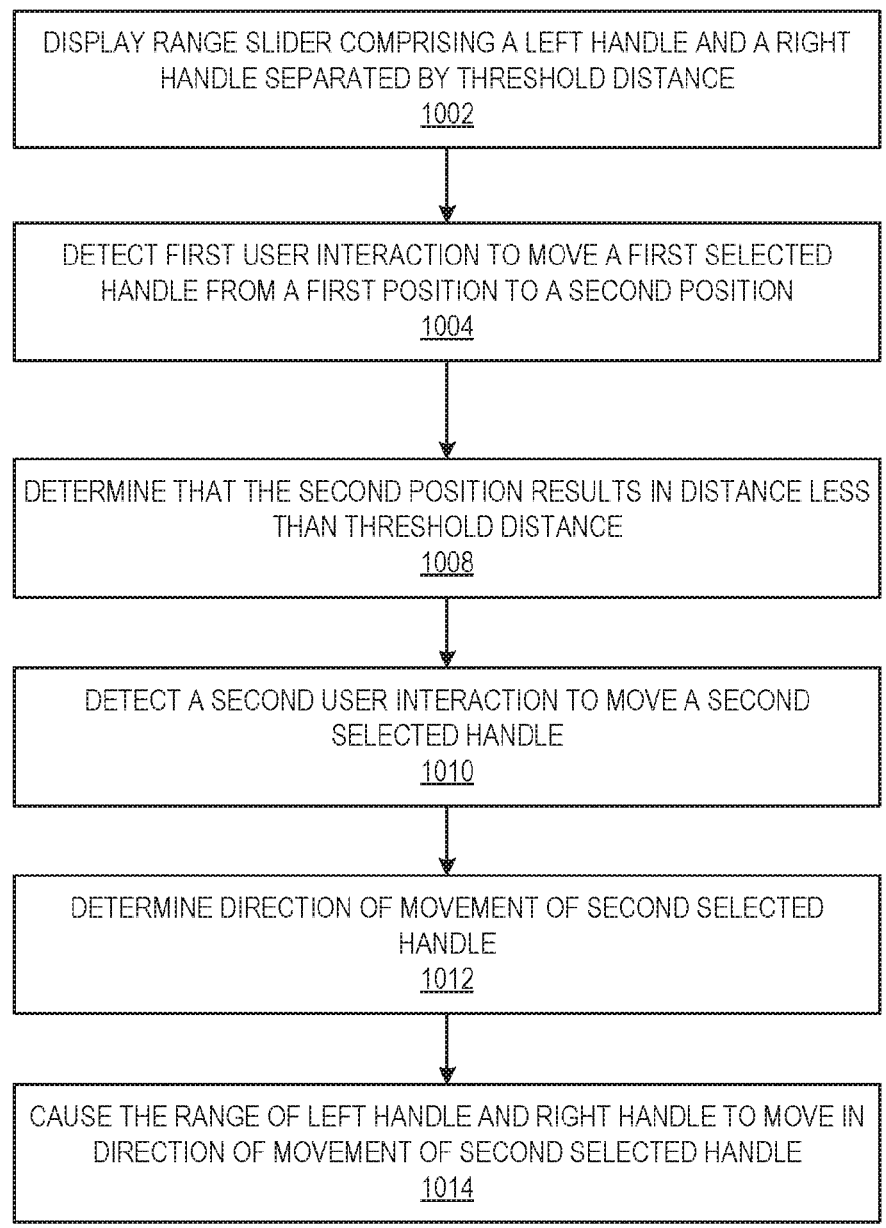
FIG. 10 is a flowchart illustrating aspects of a method, according to some example embodiments.

FIG. 10 is a flow chart illustrating aspects of a method 1000, according to some example embodiments, for behavior of a range slider control based on user interaction. For illustrative purposes, method 1000 is described with respect to the networked system 100 of FIG. 1. It is to be understood that method 1000 may be practiced with other system configurations in other embodiments.

In operation 1002, a computing device (e.g., computing device 110) displays a range slider on a display or user interface of the computing device. The range slider may comprise a left handle and a right handle. In one example embodiment, the left handle and the right handle are separated by a distance greater than a predetermined threshold distance (as described above).

At operation 1004, the computing device detects a first user interaction (e.g., via a touch screen or input device) with the range slider to move a first selected handle from a first position to a second position. For example, a user may use a mouse to move a pointer to the range slider and press a button or other control on the mouse to select the left handle or the right handle, or may touch a touch screen to select the left handle or the right handle.

At operation 1008, the computing device determines that the second position of the first selected handle results in the left handle and right handle being separated by a distance less than the predetermined threshold distance (as described above).

At operation 1010, the computing device detects a second user interaction with the range slider to move a second selected handle. At operation 1012, the computing device determines, based on the second user interaction, an initial direction of movement of the second selected handle.

The computing device determines that the second selected handle is the left handle and the initial direction of movement is to the right, or that the second selected handles is the right handle and the initial direction of movement is to the left. At operation 1014, the computing device causes the distance between the left handle and the right handle to stay constant such that the range of the left handle and the right handle moves in the initial direction of movement of the second selected handle, based on the determination that the second selected handle is the left handle and the initial direction of movement is to the right, or that the second selected handles is the right handle and the initial direction of movement is to the left. In other words, the computing device causes the distance between the left handle and the right handle to stay constant such that the range of the left handle and the right handle moves in the initial direction of movement of the second selected handle when the initial direction of movement is a direction toward the handle that is not selected. The computing device may further cause the distance between the left handle and the right handle to stay constant such that the range of the left handle and the right handle moves in the initial direction of movement of the second selected handle, based on a determination that the user interaction was with a central portion of the second selected handle.

Figure 11A:
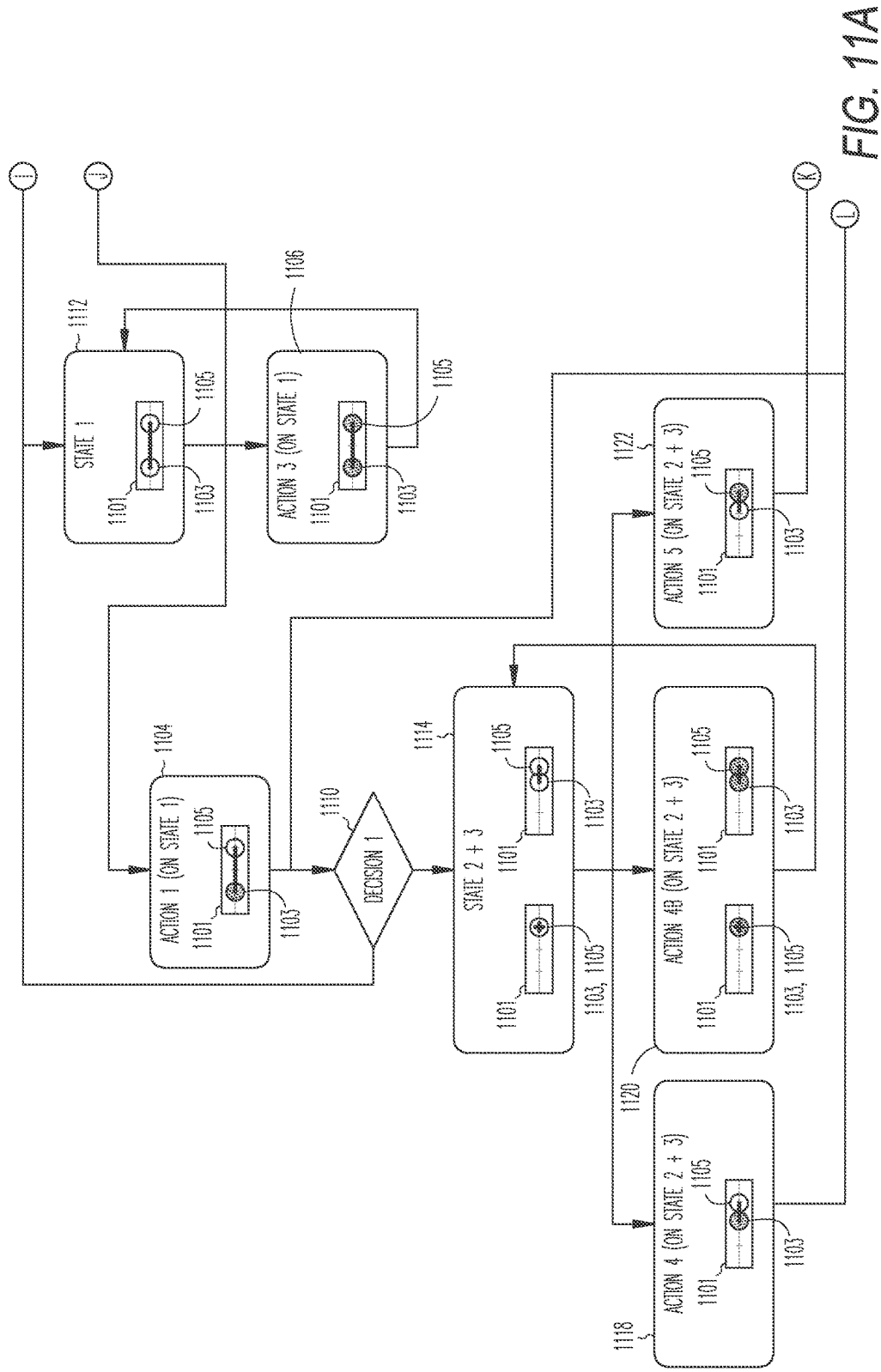
FIGS. 11A-11B show a block diagram illustrating behavior of a range slider control, according to some example embodiments.
Figure 11B:
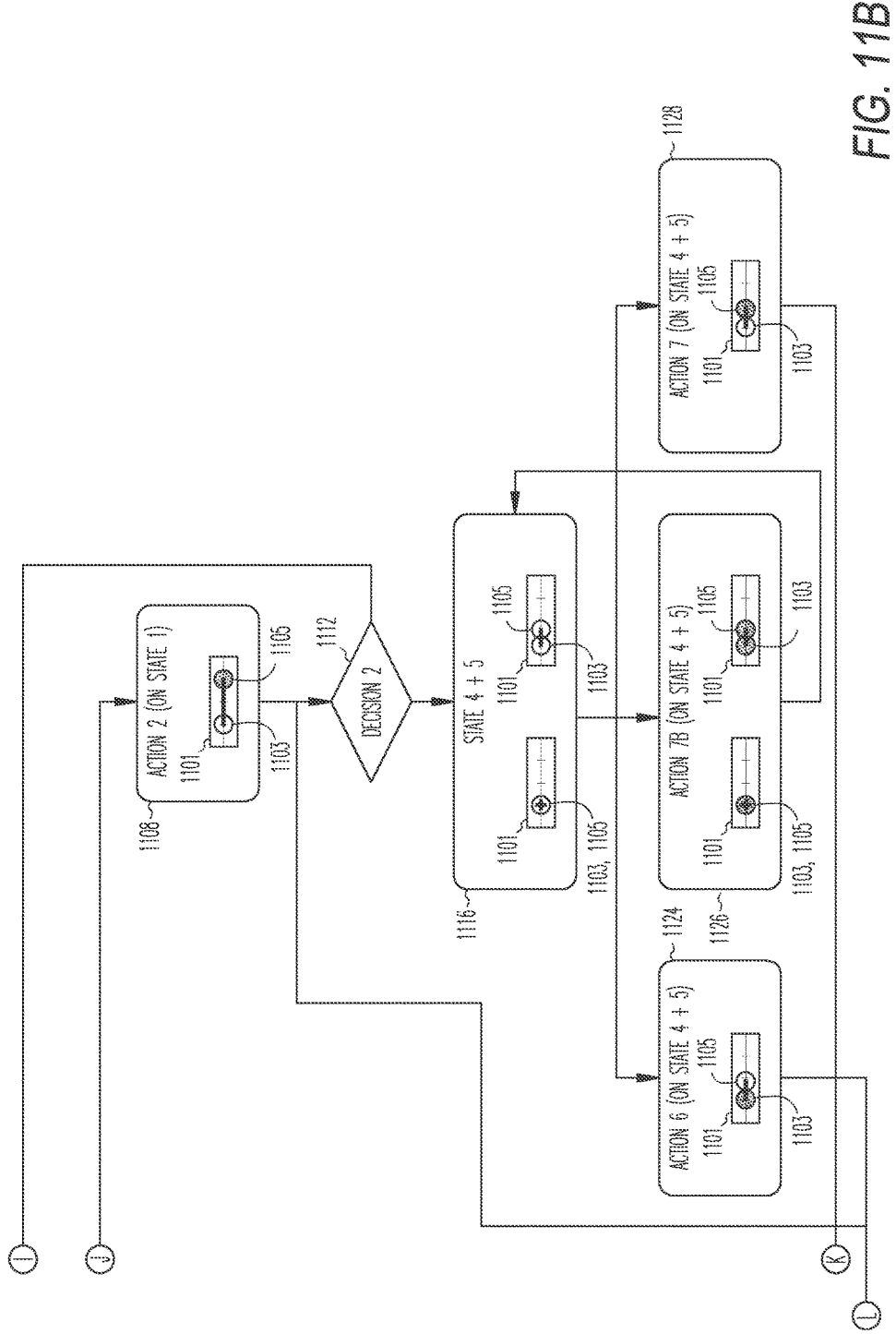

FIGS. 11A-11B show a block diagram, according to some example embodiments, illustrating behavior of a range slider control when a user moves a left handle, a right handle, or a location between the left handle and the right handle. For readability, the block diagram in FIGS. 11A-11B has been split into two pages (e.g., FIG. 11A is the left half of the figure and FIG. 11B is the right half of the figure). Reference letters on each half indicate where the two halves intersect.

The diagram of FIGS. 11A-11B is similar to the diagram of FIGS. 7A-7B and FIGS. 9A-9B, with respect to state 1, action 1, action 2, action 3, and decision 1 and decision 2. Accordingly, that description will not be repeated here.

As explained above, the area of interaction for the left handle and the right handle may be difficult to access when the distance between the left handle and the right handle is too narrow (e.g., the left handle and right handle are touching, overlapping, or in the same position). Embodiments described herein provide an extended interaction area so that the left handle and the right handle may be accessed in such a scenario.

Figure 11C:
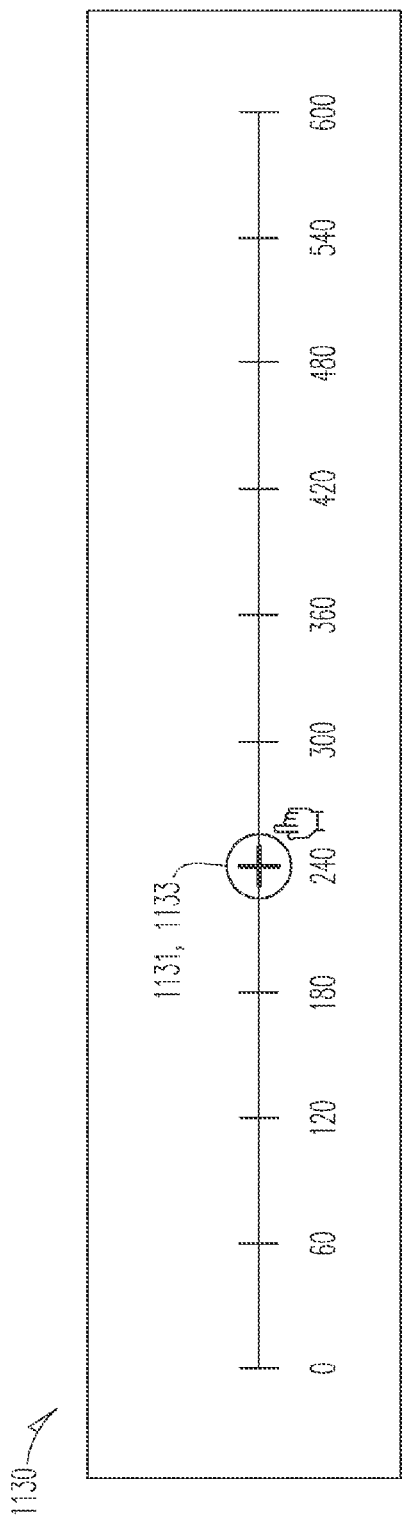
FIGS. 11C-11F illustrate example range sliders, according to some example embodiments.
Figure 11D:
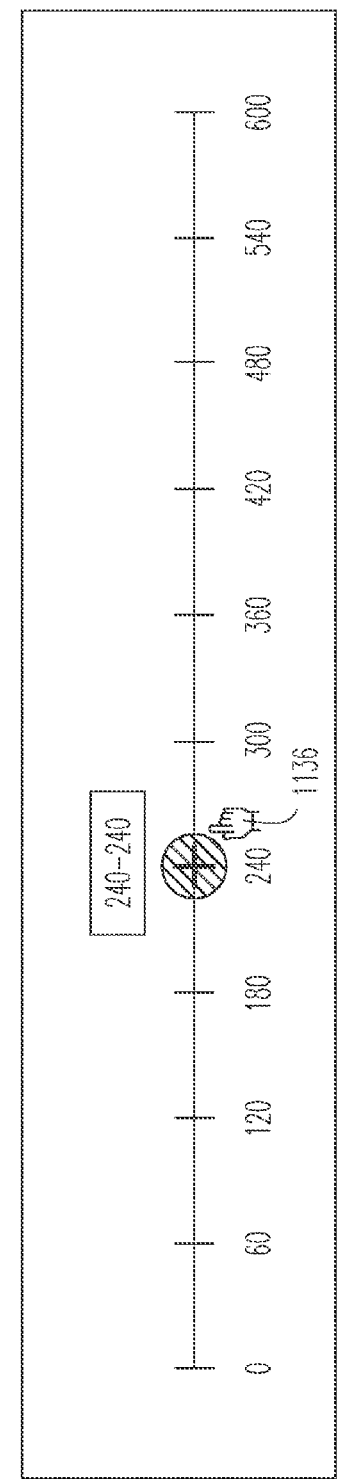
Figure 11E:
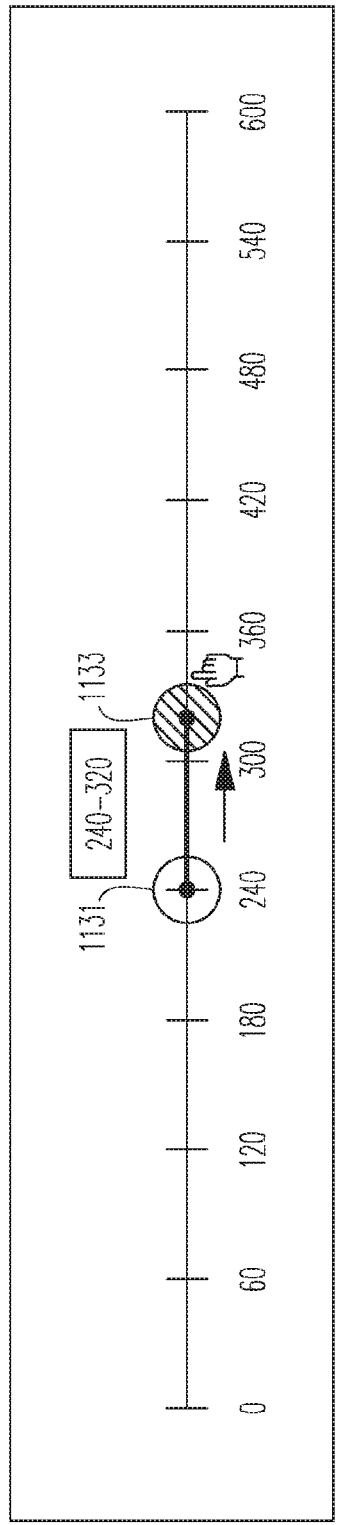

For example, FIG. 11C shows a range slider 1130 where the left handle 1131 and the right handle 1133 are in the same position. In this example, the left handle 1131 may have last been selected. In other example embodiments, if a user selects the handles 1131 and 1133 (in the same position), the left handle 1131 will be accessible since the left handle was last selected. In this example embodiment, a user may also access the right handle 1133, even though the last handle selected was the left handle 1131. For example, a user may desire to move the right handle to the right. As shown in FIG. 11D, the user may select an area 1136 slightly to the right 1136 of the combined left handle and right handle to cause the right handle to move to the right, as shown in FIG. 11E.

Returning to FIGS. 11A-11B, in state 2 and 3 (1114), the left handle 1103 and the right handle 1105 are separated by a distance less than a predetermined threshold distance, and the left handle was the last handle selected. Action 4 (1118) is a user interaction to move the left handle 1103 to the left. This would cause the left handle 1103 to be moved to the left. Action 4b (1120) is a user interaction to move the left handle 1103 to the right. This would cause the range of the left handle and the right handle to move to the right, as described in above example embodiments. Action 5 (1122) is a user interaction to move the right handle 1005 to the right. As described above, the user may select the right handle or an area slightly to the right of the right handle. This would cause the right handle 1105 to be moved to the right.

In state 4 and 5 (1116), the left handle 1103 and the right handle 1105 are separated by a distance less than a predetermined threshold distance, and the right handle was the last handle selected. Action 6 (1124) is a user interaction to move the left handle 1103 to the left. As described above, the user may select the left handle or an area slightly to the left of the left handle. This would cause the left handle 1103 to be moved to the left. Action 7b (1126) is a user interaction to move the right handle 1105 to the left. This would cause the range of the left handle and the right handle to move to the left, as described in above example embodiments. Action 7 (1128) is a user interaction to move the right handle 1105 to the right. This would cause the right handle 1105 to be moved to the right.

Figure 12:
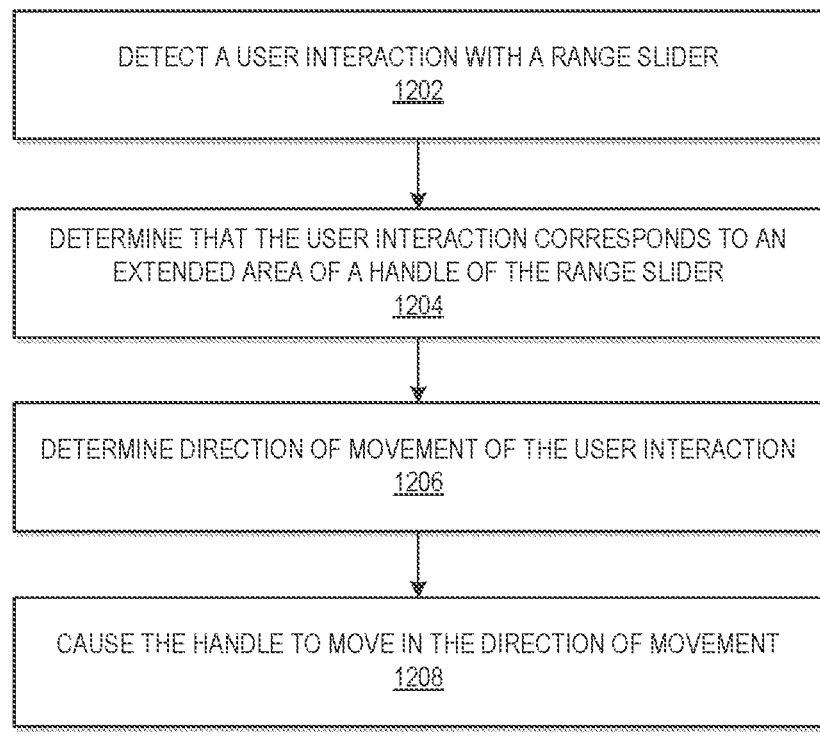
FIG. 12 is a flowchart illustrating aspects of a method, according to some example embodiments.

FIG. 12 is a flow chart illustrating aspects of a method 1200, according to some example embodiments, for behavior of a range slider control based on user interaction. For illustrative purposes, method 1200 is described with respect to the networked system 100 of FIG. 1. It is to be understood that method 1200 may be practiced with other system configurations in other embodiments.

At operation 1202, the computing device detects a user interaction (e.g., via a touch screen or input device) with the range slider. For example, a user may use a mouse to move a pointer to the range slider and press a button or other control on the mouse to select an extended area of the left handle or the right handle, or may touch a touch screen to select an extended area of the left handle or the right handle.

Figure 11F:
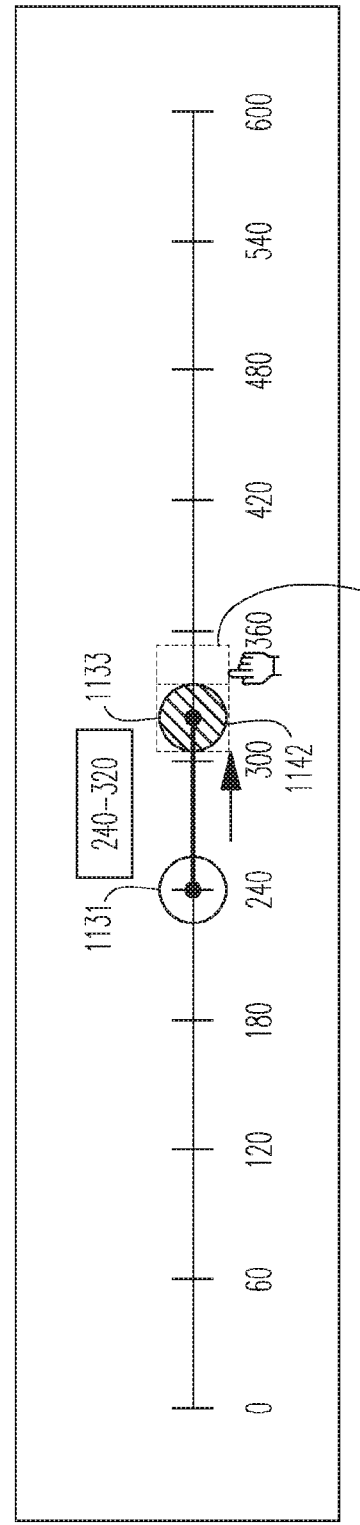

At operation 1204, the computing device determines that the user interaction corresponds to an extended area of a handle of the range slider. For example, the computing device determines a user interaction with an area near the left handle or an area near the right handle. The extended area may be an area outside of a central portion of the left handle or the right handle. In one example, the unextended area may be a bounded box 1142 around the handle 1133 as shown in the example range slider 1140 in FIG. 11F. An extended area may be a rectangle that has the same height and half the width of the square. In FIG. 11F this is shown to the right of the handle 1133 as an example. The extended area could be to the left or right of either handle, or other logical placement. The computing device may then select the handle corresponding to the user interaction.

At operation 1206, the computing device determines, based on the first user interaction, a direction of movement of the user interaction. At operation 1208, the computing device causes the selected handle (e.g., the handle corresponding to the extended area) to move in the direction of movement.

Embodiments described herein describe methods performed by a computing device. In some embodiments the computing device may be a computing device 110. In other embodiments the computing device may be a server computer, such as an application server 120, or web server 122, of server system 102. In yet other embodiments the methods described herein may be performed by a combination of computing devices.

The following examples describe various embodiments of methods, machine-readable media, and systems (e.g., machines, devices, or other apparatus) discussed herein.

EXAMPLE 1

A computing device comprising:
a processor; and
a computer readable medium coupled with the processor, the computer readable medium comprising instructions stored thereon that are executable by the processor to cause the computing device to perform operations comprising:
displaying a range slider comprising a left handle and a right handle, wherein the left handle and the right handle are separated by a distance greater than a predetermined threshold distance;
detecting a first user interaction with the range slider to move a first selected handle from a first position to a second position;
determining that the second position of the first selected handle results in the left handle and the right handle being separated by a distance less than the predetermined threshold distance;
detecting a second user interaction with the range slider to move a second selected handle;
determining, based on the user interaction, an initial direction of movement of the second selected handle;
causing the distance between the left handle and the right handle to stay constant such that the range of the left handle and the right handle moves in the initial direction of movement of the second selected handle, based on a determination that the second selected handle is the left handle and the initial direction of movement is to the right or that the second selected handle is the right handle and the initial direction of movement is to the left; and
moving the range of the left handle and the right handle.

EXAMPLE 2

A computing device according to Example 1, the operations further comprising:
determining that the first interaction with the range slider to move a first selected handle from a first position to a second position would result in the first selected handle to move beyond a handle that is not selected; and
causing the first selected handle to stop at the same position as the handle that is not selected.

EXAMPLE 3

A computing device according to any of the previous examples, the operations further comprising:
causing the second selected handle to move in the initial direction of movement based on a determination that the second selected handle is the left handle and the initial direction of movement is to the left or that the second selected handle is the right handle and the initial direction of movement is to the right.

EXAMPLE 4

A computing device according to any of the previous examples, the operations further comprising:
detecting a third user interaction with the range slider;
determining, based on the third user interaction, that a portion of the slider in between the left handle and the right handle has been selected, and a direction of movement of the third user interaction; and causing the distance between the left handle and the right handle to stay constant such that the range of the left handle and the right handle moves in the direction of movement of the third user interaction.

EXAMPLE 5

A computing device according to any of the previous examples, wherein causing the left handle and the right handle to stay constant such that the range of the left handle and the right handle moves in the initial direction of movement of the second selected handle is further based on a determination that the user interaction was with a central portion of the second selected handle.

EXAMPLE 6

A computing device according to any of the previous examples, the operations further comprising:
detecting a third user interaction with the range slider;
determining that the user interaction corresponds to an extended area of the left handle or the right handle, wherein the extended area is outside of a central portion of the left handle or the right handle;
determining, based on the user interaction, a direction of movement for the third user interaction; and
causing a handle corresponding to the extended area to move in the direction of movement for the third user interaction.

EXAMPLE 7

A computing device according to any of the previous examples, wherein the extended area of the third selected handle includes a predetermined area outside of the third selected handle.

EXAMPLE 8

A computing device according to any of the previous examples, wherein the predetermined threshold distance is a distance greater than where the left handle and the right handle are touching or overlapping.

EXAMPLE 9

A computing device according to any of the previous examples, wherein the computing device comprises a touchscreen and the user interaction with the range slider is via the touchscreen.

EXAMPLE 10

A method comprising:
displaying, by a computing device, in a user interface, a range slider comprising a left handle and a right handle, wherein the left handle and the right handle are separated by a distance greater than a predetermined threshold distance;
detecting, by the user interface, a first user interaction with the range slider to move a first selected handle from a first position to a second position;
determining, by the user interface, that the second position of the first selected handle results in the left handle and the right handle being separated by a distance less than the predetermined threshold distance;
detecting, by the user interface, a second user interaction with the range slider to move a second selected handle;
determining, based on the user interaction, an initial direction of movement of the second selected handle; and
causing the distance between the left handle and the right handle to stay constant such that the range of the left handle and the right handle moves in the initial direction of movement of the second selected handle, based on a determination that the second selected handle is the left handle and the initial direction of movement is to the right or that the second selected handle is the right handle and the initial direction of movement is to the left; and
moving the range of the left handle and the right handle in the initial direction of movement.

EXAMPLE 11

A method according to Example 1, further comprising:
determining that the first interaction with the range slider to move a first selected handle from a first position to a second position would result in the first selected handle to move beyond a handle that is not selected; and
causing the first selected handle to stop at the same position as the handle that is not selected.

EXAMPLE 12

A method according to any of the previous examples, further comprising:
causing an indication to be displayed to indicate that both the left handle and the right handle are at the same position.

EXAMPLE 13

The method according to any of the previous examples, further comprising:
causing the second selected handle to move in the initial direction of movement based on a determination that the second selected handle is the left handle and the initial direction of movement is to the left or that the second selected handle is the right handle and the initial direction of movement is to the right.

EXAMPLE 14

The method according to any of the previous examples, further comprising:
detecting a third user interaction with the range slider;
determining, based on the third user interaction, that a portion of the slider in between the left handle and the right handle has been selected, and a direction of movement of the third user interaction; and
causing the distance between the left handle and the right handle to stay constant such that the range of the left handle and the right handle moves in the direction of movement of the third user interaction.

EXAMPLE 15

The method according to any of the previous examples, wherein causing the left handle and the right handle to stay constant such that the range of the left handle and the right handle moves in the initial direction of movement of the second selected handle is further based on a determination that the user interaction was with a central portion of the second selected handle.

EXAMPLE 16

The method according to any of the previous examples, further comprising:
  detecting a third user interaction with the range slider;
  determining that the user interaction corresponds to an extended area of the left handle or the right handle, wherein the extended area is outside of a central portion of the left handle or the right handle;
  determining, based on the third user interaction, a direction of movement for the user interaction; and
  causing a handle corresponding to the extended area to move in the direction of movement for the third user interaction.

EXAMPLE 17

The method according to any of the previous examples, wherein the extended area of the third selected handle includes a predetermined area outside of the third selected handle.

EXAMPLE 18

The method according to any of the previous examples, wherein the predetermined threshold distance is a distance greater than where the left handle and the right handle are touching or overlapping.

EXAMPLE 19

The method according to any of the previous examples, wherein the computing device comprises a touchscreen and the user interaction with the range slider is via the touchscreen.

EXAMPLE 20

A non-transitory computer readable medium comprising instructions stored thereon that are executable by at least one processor to cause a computing device to perform operations comprising:
  displaying a range slider comprising a left handle and a right handle, wherein the left handle and the right handle are separated by a distance greater than a predetermined threshold distance;
  detecting a first user interaction with the range slider to move a first selected handle from a first position to a second position;
  determining that the second position of the first selected handle results in the left handle and the right handle being separated by a distance less than the predetermined threshold distance;
  detecting a second user interaction with the range slider to move a second selected handle;
  determining, based on the user interaction, an initial direction of movement of the second selected handle;
  causing the distance between the left handle and the right handle to stay constant such that the range of the left handle and the right handle moves in the initial direction of movement of the second selected handle based on a determination that the second selected handle is the left handle and the initial direction of movement is to the right or that the second selected handle is the right handle and the initial direction of movement is to the left; and
  moving the range of the left handle and the right handle in the initial direction of movement.

Figure 13:
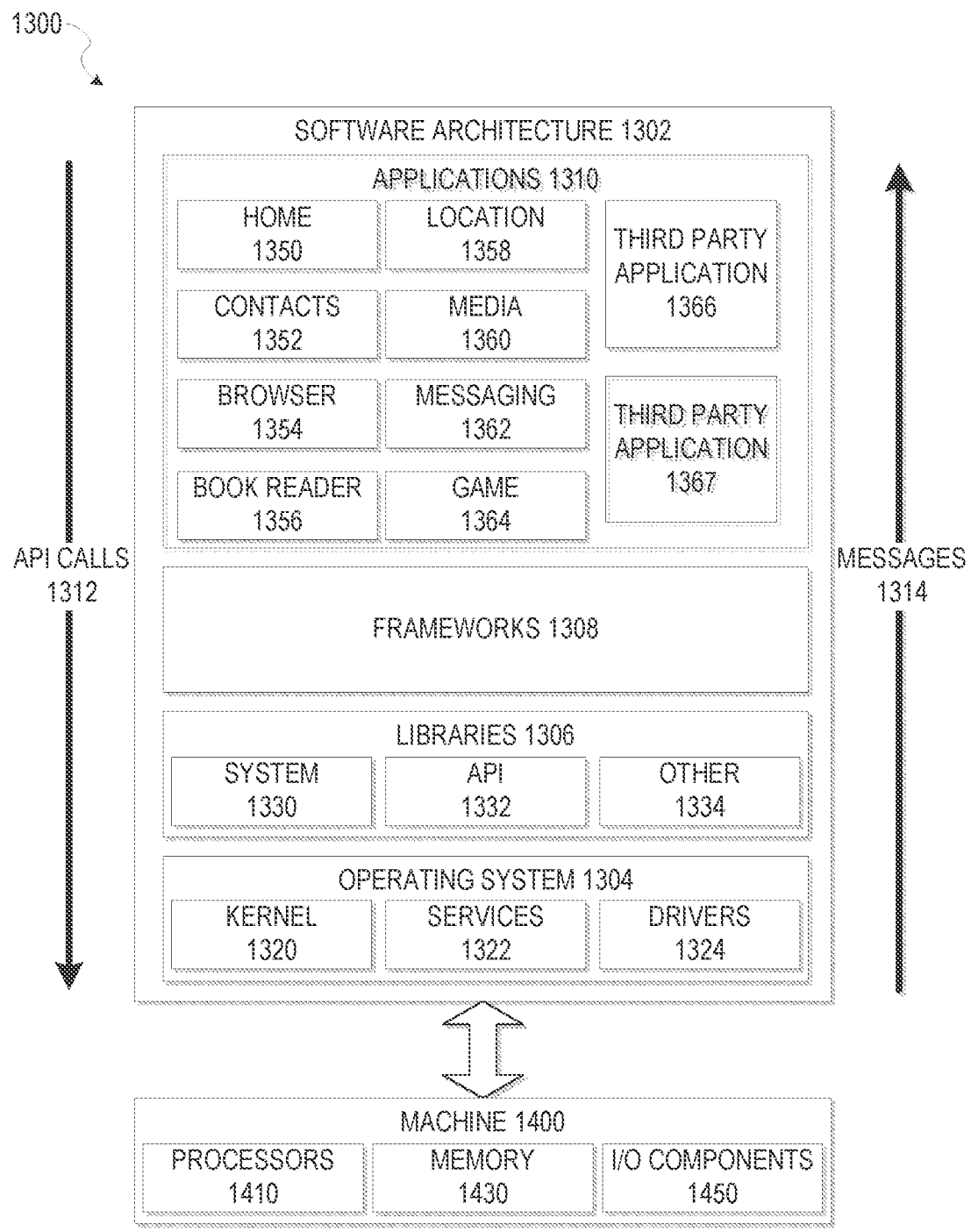
FIG. 13 is a block diagram illustrating an example of a software architecture that may be installed on a machine, according to some example embodiments, configured to provide interaction mechanisms for range slider control.

FIG. 13 is a block diagram 1300 illustrating software architecture 1302, which can be installed on any one or more of the devices described above. For example, in various embodiments, computing devices 110, server system 102, and servers 118, 120 and 122, may be implemented using some or all of the elements of software architecture 1302. FIG. 13 is merely a non-limiting example of a software architecture, and it will be appreciated that many other architectures can be implemented to facilitate the functionality described herein. In various embodiments, the software architecture 1302 is implemented by hardware such as machine 1400 of FIG. 14 that includes processors 1410, memory 1430, and I/O components 1450. In this example, the software architecture 1302 can be conceptualized as a stack of layers where each layer may provide a particular functionality. For example, the software architecture 1302 includes layers such as an operating system 1304, libraries 1306, frameworks 1308, and applications 1310. Operationally, the applications 1310 invoke application programming interface (API) calls 1312 through the software stack and receive messages 1314 in response to the API calls 1312, consistent with some embodiments.

In various implementations, the operating system 1304 manages hardware resources and provides common services. The operating system 1304 includes, for example, a kernel 1320, services 1322, and drivers 1324. The kernel 1320 acts as an abstraction layer between the hardware and the other software layers, consistent with some embodiments. For example, the kernel 1320 provides memory management, processor management (e.g., scheduling), component management, networking, and security settings, among other functionality. The services 1322 can provide other common services for the other software layers. The drivers 1324 are responsible for controlling or interfacing with the underlying hardware, according to some embodiments. For instance, the drivers 1324 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1306 provide a low-level common infrastructure utilized by the applications 1310. The libraries 1306 can include system libraries 1330 (e.g., C standard library) that can provide functions such as memory allocation functions, string manipulation functions, mathematic functions, and the like. In addition, the libraries 1306 can include API libraries 1332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in graphic content on a display), database libraries (e.g., SQLite to provide various relational database functions), web libraries (e.g., WebKit to provide web browsing functionality), and the like. The libraries 1306 can also include a wide variety of other libraries 1334 to provide many other APIs to the applications 1310.

The frameworks 1308 provide a high-level common infrastructure that can be utilized by the applications 1310, according to some embodiments. For example, the frameworks 1308 provide various graphic user interface (GUI) functions, high-level resource management, high-level location services, and so forth. The frameworks 1308 can provide a broad spectrum of other APIs that can be utilized by the applications 1310, some of which may be specific to a particular operating system 1304 or platform.

In an example embodiment, the applications 1310 include a home application 1350, a contacts application 1352, a browser application 1354, a book reader application 1356, a location application 1358, a media application 1360, a messaging application 1362, a game application 1364, and a broad assortment of other applications such as a third party applications 1366 and 1367. According to some embodiments, the applications 1310 are programs that execute functions defined in the programs. Various programming languages can be employed to create one or more of the applications 1310, structured in a variety of manners, such as object-oriented programming languages (e.g., Objective-C, Java, or C++) or procedural programming languages (e.g., C or assembly language). In a specific example, the third party application 1366 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 1366 can invoke the API calls 1312 provided by the operating system 1304 to facilitate functionality described herein.

Figure 14:
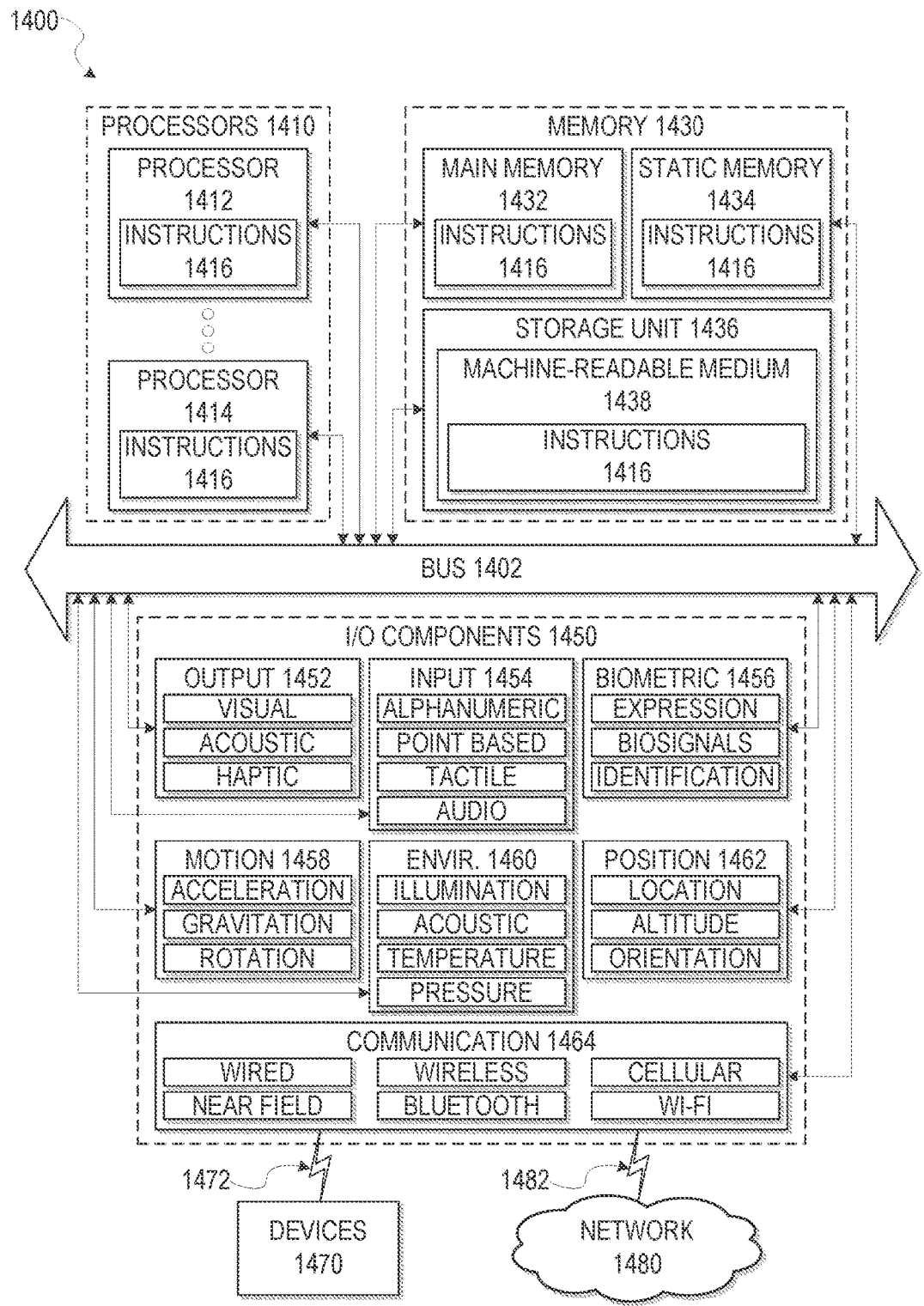
FIG. 14 illustrates a diagrammatic representation of a machine, in the form of a computer system, within which a set of instructions may be executed for causing the machine to perform any one or more of the methodologies discussed herein, according to some example embodiments.

FIG. 14 is a block diagram illustrating components of a machine 1400, according to some embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1416 (e.g., software, a program, an application 1310, an applet, an app, or other executable code) for causing the machine 1400 to perform any one or more of the methodologies discussed herein can be executed. In alternative embodiments, the machine 1400 operates as a standalone device or can be coupled (e g., networked) to other machines. In a networked deployment, the machine 1400 may operate in the capacity of a server machine 102, 118, 120, 122, and the like or a computing device 110 in a server-client network environment, or as a peer machine in a peer-to-peer (or distributed) network environment. The machine 1400 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines 1400 that individually or jointly execute the instructions 1416 to perform any one or more of the methodologies discussed herein.

In various embodiments, the machine 1400 comprises processors 1410, memory 1430, and I/O components 1450, which can be configured to communicate with each other via a bus 1402. In an example embodiment, the processors 1410 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1412 and a processor 1414 that may execute the instructions 1416. The term "processor" is intended to include multi-core processors 1410 that may comprise two or more independent processors 1412, 1414 (also referred to as "cores") that can execute instructions 1416 contemporaneously. Although FIG. 14 shows multiple processors 1410, the machine 1400 may include a single processor 1410 with a single core, a single processor 1410 with multiple cores (e.g., a multi-core processor 1410), multiple processors 1412, 1414 with a single core, multiple processors 1410, 1412 with multiples cores, or any combination thereof.

The memory 1430 comprises a main memory 1432, a static memory 1434, and a storage unit 1436 accessible to the processors 1410 via the bus 1402, according to some embodiments. The storage unit 1436 can include a machine-readable medium 1438 on which are stored the instructions 1416 embodying any one or more of the methodologies or functions described herein. The instructions 1416 can also reside, completely or at least partially, within the main memory 1432, within the static memory 1434, within at least one of the processors 1410 (e.g., within the processor's cache memory), or any suitable combination thereof, during execution thereof by the machine 1400. Accordingly, in various embodiments, the main memory 1432, the static memory 1434, and the processors 1410 are considered machine-readable media 1438.

As used herein, the term "memory" refers to a machine-readable medium 1438 able to store data temporarily or permanently and may be taken to include, but not be limited to, random-access memory (RAM), read-only memory (ROM), buffer memory, flash memory, and cache memory. While the machine-readable medium 1438 is shown, in an example embodiment, to be a single medium, the term "machine-readable medium" should be taken to include a single medium or multiple media (e.g., a centralized or distributed database, or associated caches and servers) able to store the instructions 1416. The term "machine-readable medium" shall also be taken to include any medium, or combination of multiple media, that is capable of storing instructions (e.g., instructions 1416) for execution by a machine (e.g., machine 1400), such that the instructions 1416, when executed by one or more processors of the machine 1400 (e.g., processors 1410), cause the machine 1400 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1450 include a wide variety of components to receive input, provide output, produce output, transmit information, exchange information, capture measurements, and so on. In general, it will be appreciated that the I/O components 1450 can include many other components that are not shown in FIG. 14. The I/O components 1450 are grouped according to functionality merely for simplifying the following discussion, and the grouping is in no way limiting. In various example embodiments, the I/O components 1450 include output components 1452 and input components 1454. The output components 1452 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1454 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the 110 components 1450 include biometric components 1456, motion components 1458, environmental components 1460, or position components 1462, among a wide array of other components. For example, the biometric components 1456 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1458 include acceleration sensor components (e.g., accelerometer), gravitation sensor components, rotation sensor components (e.g., gyroscope), and so forth. The environmental components 1460 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1462 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1450 may include communication components 1464 operable to couple the machine 1400 to a network 1480 or devices 1470 via a coupling 1482 and a coupling 1472, respectively. For example, the communication components 1464 include a network interface component or another suitable device to interface with the network 1480. In further examples, communication components 1464 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1470 may be another machine 1400 or any of a wide variety of peripheral devices (e.g., a peripheral device coupled via a Universal Serial Bus (USB)).

Moreover, in some embodiments, the communication components 1464 detect identifiers or include components operable to detect identifiers. For example, the communication components 1464 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1464, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1480 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1480 or a portion of the network 1480 may include a wireless or cellular network, and the coupling 1482 may be a Code Division Multiple Access (CDMA) connection, a Global System for Mobile communications (GSM) connection, or another type of cellular or wireless coupling. In this example, the coupling 1482 can implement any of a variety of types of data transfer technology, such as Single Carrier Radio Transmission Technology (1xRTT), Evolution-Data Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1416 are transmitted or received over the network 1480 using a transmission medium via a network interface device (e.g., a network interface component included in the communication components 1464) and utilizing any one of a number of well-known transfer protocols (e.g., Hypertext Transfer Protocol (HTTP)). Similarly, in other example embodiments, the instructions 1416 are transmitted or received using a transmission medium via the coupling 1472 (e.g., a peer-to-peer coupling) to the devices 1470. The term "transmission medium" shall be taken to include any intangible medium that is capable of storing, encoding, or carrying the instructions 1416 for execution by the machine 1400, and includes digital or analog communications signals or other intangible media to facilitate communication of such software.

Furthermore, the machine-readable medium 1438 is non-transitory (in other words, not having any transitory signals) in that it does not embody a propagating signal. However, labeling the machine-readable medium 1438 "non-transitory" should not be construed to mean that the medium is incapable of movement; the medium 1438 should be considered as being transportable from one physical location to another. Additionally, since the machine-readable medium 1438 is tangible, the medium 1438 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computing device comprising:
a display;
a processor; and
a computer readable medium coupled with the processor, the computer readable medium comprising instructions stored thereon that are executable by the processor to cause the computing device to perform operations comprising:
displaying, on the display, a range slider comprising a left handle and a right handle, wherein the left handle and the right handle are separated by a distance greater than a predetermined threshold distance;
detecting a first user interaction with the range slider to move a first selected handle from a first position to a second position;
determining that the second position of the first selected handle results in the left handle and the right handle being separated by a distance less than the predetermined threshold distance such that the left handle and the right handle overlap in the display;
detecting a second user interaction with the range slider to move a second selected handle, the left handle and the right handle of the range slider being separated by the distance less than the predetermined threshold such that the left handle and the right handle overlap in the display;
determining, based on the second user interaction, an initial direction of movement of the second selected handle;
determining whether the second selected handle is the left handle or the right handle of the range slider;
causing the distance between the left handle and the right handle to stay constant such that the range of the left handle and the right handle moves in the initial direction of movement of the second selected handle, when determining that the second selected handle is the left handle and the initial direction of movement is to the right;
causing the distance between the left handle and the right handle stay constant such that the range of the left handle and right handle moves in the initial direction of movement of the second selected handle, when determining that the second selected handle is the right handle and the initial direction of movement is to the left; and
moving the range of the left handle and the right handle in the initial direction of movement.

2. The computing device of claim 1, the operations further comprising:
determining that the first interaction with the range slider to move a first selected handle from a first position to a second position would result in the first selected handle to move beyond a handle that is not selected; and
causing the first selected handle to stop at the same position as the handle that is not selected.

3. The computing device of claim 1, the operations further comprising:
causing the second selected handle to move in the initial direction of movement based on a determination that the second selected handle is the left handle and the initial direction of movement is to the left, or that the second handle is the right handle and the initial direction of movement is to the right.

4. The computing device of claim 1, the operations further comprising:
detecting a third user interaction with the range slider;
determining, based on the third user interaction, that a portion of the slider in between the left handle and the right handle has been selected, and a direction of movement of the third user interaction; and
causing the distance between the left handle and the right handle to stay constant such that the range of the left handle and the right handle moves in the direction of movement of the third user interaction.

5. The computing device of claim 1, wherein causing the left handle and the right handle to stay constant such that the range of the left handle and the right handle moves in the initial direction of movement of the second selected handle is further based on a determination that the user interaction was with a central portion of the second selected handle.

6. The computing device of claim 5, the operations further comprising:
detecting a third user interaction with the range slider;
determining, that the user interaction corresponds to an extended area of the left handle or the right handle, wherein the extended area is outside of a central portion of the left handle or the right handle;
determining, based on the user interaction, a direction of movement for the third user interaction; and
causing a handle corresponding to the extended area to move in the direction of movement for the third user interaction.

7. The computing device of claim 6, wherein the extended area of the third selected handle include a predetermined area outside of the third selected handle.

8. The computing device of claim 1, wherein the predetermined threshold distance is a distance greater than where the left handle and the right handle are touching or overlapping.

9. The computing device of claim 1, wherein the computing device comprises a touchscreen and the user interaction with the range slider is via the touchscreen.

10. A method comprising:
displaying, by a computing device, in a user interface, a range slider comprising a left handle and a right handle, wherein the left handle and the right handle are separated by a distance greater than a predetermined threshold distance;
detecting, by the user interface, a first user interaction with the range slider to move a first selected handle from a first position to a second position;
determining, by the user interface, that the second position of the first selected handle results in the left handle and the right handle being separated by a distance less than the predetermined threshold distance such that the left handle and the right handle overlap in the user interface;
detecting, by the user interface, a second user interaction with the range slider to move a second selected handle, the left handle and the right handle of the range slider being separated by the distance less than the predetermined threshold such that the left handle and the right handle overlap in the user interface;
determining, based on the second user interaction, an initial direction of movement of the second selected handle;

determining whether the second selected handle is the left handle or the right handle of the range slider;
causing the distance between the left handle and the right handle to stay constant such that the range of the left handle and the right handle moves in the initial direction of movement of the second selected handle, when determining that the second selected handle is the left handle and the initial direction of movement is to the right ;
causing the distance between the left handle and the right handle stay constant such that the range of the left handle and right handle moves in the initial direction of movement of the second selected handle, when determining that the second selected handle is the right handle and the initial direction of movement is to the left; and
moving the range of the left handle and the right handle in the initial direction of movement.

11. The method of claim 10, further comprising:
determining that the first interaction with the range slider to move a first selected handle from a first position to a second position would result in the first selected handle to move beyond a handle that is not selected; and
causing the first selected handle to stop at the same position as the handle that is not selected.

12. The method of claim 11, further comprising:
causing an indication to be displayed to indicate that both the left handle and the right handle are at the same position.

13. The method of claim 10, further comprising:
causing the second selected handle to move in the initial direction of movement based on a determination that the second selected handle is the same as the first selected handle and based on a determination that the direction of movement of the second selected handle is the left handle and the initial direction of movement is to the left or that the second selected handle is the right handle and the initial direction of movement is to the right.

14. The method of claim 10, further comprising:
detecting a third user interaction with the range slider;
determining, based on the third user interaction, that a portion of the slider in between the left handle and the right handle has been selected, and a direction of movement of the third user interaction; and
causing the distance between the left handle and the right handle to stay constant such that the range of the left handle and the right handle moves in the direction of movement of the third user interaction.

15. The method of claim 10, wherein causing the left handle and the right handle to stay constant such that the range of the left handle and the right handle moves in the direction of movement of the second selected handle is further based on a determination that the user interaction was with a central portion of the second selected handle.

16. The method of claim 15, further comprising:
detecting a third user interaction with the range slider;
determining, that the third user interaction corresponds to an extended area of the left handle or the right handle, wherein the extended area is outside of a central portion of the left handle or the right handle;
determining, based on the third user interaction, a direction of movement for the third user interaction; and
causing a handle corresponding to the extended area to move in the direction of movement for the third user interaction.

17. The method of claim 16, wherein the extended area of the third selected handle include a predetermined area outside of the third selected handle.

18. The method of claim 10, wherein the predetermined threshold distance is a distance greater than where the left handle and the right handle are touching or overlapping.

19. The method of claim 1, wherein the computing device comprises a touchscreen and the user interaction with the range slider is via the touchscreen.

20. A non-transitory computer readable medium comprising instructions stored thereon that are executable by at least one processor to cause a computing device to perform operations comprising:

displaying a range slider comprising a left handle and a right handle, wherein the left handle and the right handle are separated by a distance greater than a predetermined threshold distance;

detecting a first user interaction with the range slider to move a first selected handle from a first position to a second position;

determining that the second position of the first selected handle results in the left handle and the right handle being separated by a distance less than the predetermined threshold distance such that the left handle and the right handle overlap in a display of the computing device;

detecting a second user interaction with the range slider to move a second selected handle, the left handle and the right handle of the range slider being separated by the distance less than the predetermined threshold such that the left handle and the right handle overlap in the display;

determining, based on the second user interaction, an initial direction of movement of the second selected handle;

determining whether the second selected handle is the left handle or the right handle of the range slider;

causing the distance between the left handle and the right handle to stay constant such that the range of the left handle and the right handle moves in the initial direction of movement of the second selected handle, when determining that the second selected handle is the left handle and the initial direction of movement is to the right;

causing the distance between the left handle and the right handle stay constant such that the range of the left handle and right handle moves in the initial direction of movement of the second selected handle, when determining that the second selected handle is the right handle and the initial direction of movement is to the left; and moving the range of the left handle and the right handle in the direction of movement of the second selected handle.

* * * * *